US012728354B2

(12) United States Patent
Bavelier et al.

(10) Patent No.: US 12,728,354 B2
(45) Date of Patent: Sep. 8, 2026

(54) COMPUTER SYSTEM AND METHOD FOR AUTOMATICALLY ADAPTING DIFFICULTY LEVELS OF A VIDEO GAME

(71) Applicants: University of Geneva, Geneva (CH); Yissum Research Development Company of The Hebrew University of Jerusalem Ltd., Jerusalem (IL)

(72) Inventors: Daphné Bavelier, Le Grand Saconnex (CH); Angela Pasqualotto, Geneva (CH); Mor Nahum, Tel Aviv (IL); Zeno Menestrina, Trento (IT); Adriano Siesser, Levico Terme (IT)

(73) Assignee: University of Geneva, Geneva (CH)

( * ) Notice: Subject to any disclaimer, the term of this patent is extended or adjusted under 35 U.S.C. 154(b) by 290 days.

(21) Appl. No.: 18/419,260

(22) Filed: Jan. 22, 2024

(65) Prior Publication Data

US 2024/0157247 A1 May 16, 2024

Related U.S. Application Data

(63) Continuation of application No. PCT/EP2021/071080, filed on Jul. 27, 2021.

(51) Int. Cl.
*A63F 13/67* (2014.01)

(52) U.S. Cl.
CPC .................................... *A63F 13/67* (2014.09)

(58) Field of Classification Search
CPC ......... A63F 13/67; A63F 13/69; A63F 13/798
See application file for complete search history.

(56) References Cited

U.S. PATENT DOCUMENTS

2018/0147493 A1* 5/2018 Cohen .................. A63F 13/822

OTHER PUBLICATIONS

Alexopoulos G. S.: "Depression in the elderly". Lancet, vol. 365, Jun. 4, 2005, pp. 1961-1970.

Austin, M., et al.: "Cognitive deficits in depression: Possible implications for functional neuropathology," British Journal of Psychiatry, 178(3), 2001, pp. 200-206.

(Continued)

*Primary Examiner* — Kevin Y Kim

(74) *Attorney, Agent, or Firm* — Brake Hughes Bellermann LLP

(57) ABSTRACT

Techniques are provided for automatically adapting difficulty levels of a video game to improve the learning-to-learn capability of a user. An action video game hub module provides an action video game with action-mechanics, adapted to engage the user with adaptively selected game modules. The hub and game modules capture the user's gaming performance. The hub module and each game module generate a difficulty setting. Each setting comprises a plurality of level dimensions for a respective main level, with each level dimension being associated with a different aspect of the user's gaming performance and having a plurality of dimension-specific sub-levels defining a current position in a multidimensional sub-level space. The system uses probabilistic processes to switch the main level or to switch one of the sub-levels in accordance with the user's gaming performance for adjusting the difficulty level to the user's performance.

19 Claims, 10 Drawing Sheets

(56) References Cited

OTHER PUBLICATIONS

Biancardi A. et al.: "Modified Bell Test," Child and Adolescent Psychiatry, 1997, along with machine English translation, 24 pages.
Cardoso-Leite, P. et al.: "Games for enhancing cognitive abilities", Chapter 18 from "Handbook of Game-based Learning", edited by J. Plass et al., MIT Press, 2020, pp. 437-468, available at <https://mitpress.mit.edu/books/ handbook-game-based-learning>.
Diamond, A. et al.: "Conclusions about interventions, programs, and approaches for improving executive functions that appear justified and those that, despite much hype, do not", Developmental Cognitive Neuroscience , vol. 18, 2016, pp. 34-48.
Gorlyn, M., et al.: "Neuropsychological characteristics as predictors of SSRI treatment response in depressed subjects", Journal of neural transmission, 115(8), Aug. 2008, pp. 1213-1219.
International Search Report and Written Opinion for PCT Application PCT/EP2021/071080, mailed on Apr. 21, 2022, 14 pages.
Kampf-Sherf, O. et al.: "Neuropsychological functioning in major depression and responsiveness to selective serotonin reuptake inhibitors antidepressants", Journal of affective disorders, vol. 82, 2004, pp. 453-459.
Motter, J. N., et al.: "Computerized cognitive training and functional recovery in major depressive disorder: A meta-analysis". Journal of affective disorders, vol. 189, 2016, pp. 184-191.
Owen, A. M. et al.: "Putting brain training to the test," Nature, vol. 465, Jun. 10, 2010, pp. 775-778. https://doi.org/10.1038/nature09042.
Streicher, Alexander , et al., "Personalized and Adpative Serious Games", Springer International Publishing AG 2016; Entertainmnt Computing and Serious Games, LNCS 9970;, 2016, pp. 332-377.
Zohaib, Mohammad , "Dynamic Dificulty Adjustment (DDA) in Computer Games: a Review", Hindawi, Advances in Human-Computer Interaction, vol. 2018, Article ID 5681652; https://doi.org/10.1155/2018/5681652;, 2018, 13 pages.

* cited by examiner

COMPUTER SYSTEM AND METHOD FOR AUTOMATICALLY ADAPTING DIFFICULTY LEVELS OF A VIDEO GAME

CROSS REFERENCE TO RELATED APPLICATIONS

This application claims priority to, and is a continuation of PCT/EP2021/071080 filed on Jul. 27, 2021 and entitled "COMPUTER SYSTEM AND METHOD FOR AUTOMATICALLY ADAPTING DIFFICULTY LEVELS OF A VIDEO GAME," the disclosure of which is hereby incorporated by reference in its entirety.

TECHNICAL FIELD

The present description generally relates to improving a brain function of a user, and in particular, relates to methods, computer program products and systems for automatically adapting difficulty levels of a video game in relation to the gaming performance of the user, wherein the gaming performance reflects the capabilities of said brain function.

BACKGROUND

The role of action mechanics of video games in enhancing attentional control of a gaming user has been reviewed. A growing number of studies shows the importance of attentional control for success in school, at work, and more generally during the life span. Indeed, attentional control is crucial whenever humans have to concentrate and think, when acting on their initial impulse or going on automatic would be counterproductive or even impossible. In the past two decades, there has been great interest in improving these skills, accelerating their development and/or remediating deficits. Several different methods have been used including diverse types of computerized cognitive training and, while it is now clear that training on a particular attentional control—demanding task leads to improvement on that task, it is still questionable whether these improvements generalize to non-trained tasks, and more generally real-life tasks.

SUMMARY

Hence, there is a need for improved methods and systems for providing video games which can be used to improve a video game user's brain functions—in particular the learning-to-learn ability of the user's brain. Video games which are configured to improve the user's learning-to-learn capability allow the user to improve certain capabilities in a way that generalize and thus support the treatment of brain-related issues or brain dysfunctions. The herein disclosed approach combines the benefits from three distinct approaches: (i) targeted training of cognitive and emotional control tasks, (ii) training that uses action mechanics, and (iii) training that uses best practices in video game design. The former has been shown to result in cognitive and emotional control improvements on the trained tasks. Yet, in isolation, this improvement remains highly specific to the trained tasks, limiting therapeutic impact. In contrast, action mechanics generate greater generalization through targeting learning-to-learn. By embedding the targeted training within an action video game, the full therapeutic potential of the disclosed approach is released.

For example, in a modular version that integrates cognitive modules relevant for reading, improving the learning-to-learn function allows a user to significantly strengthen their learning-to-read abilities. This has been shown in a study with both typically-developing children (N=150) and children with reading disability (N=55 or also known as dyslexic children). The same concept is also applicable to brain-related issues or brain dysfunctions. For example, in a modular version that integrates cognitive and emotional modules relevant for depression, improving the learning-to-learn capability of a user is being used to enhance the control exerted by the frontal cortex on interfering thoughts so as to limit ruminations.

Five key mechanics define action video games and if present in a learning environment foster learning-to-learn. These five key mechanics are (i) pacing or the need for making decisions under time pressure, (ii) a load on divided attention or the need to sustain attention over a large part of one's environment, (iii) the need to switch between this latter divided attention state and a more focused attentional state (as required by precise aiming in shooter game for example) as a function of the ever-changing game contingencies; (iv) the need for prediction (the activities need to be structured enough that one can learn through trial and errors), and (v) the need for variability (the activities need to be diverse enough to avoid automatization of the trained brain functions; indeed full automatization limits generalization and the benefits of learning-to-learn). It is hypothesized that the combination of these five game mechanics is central in enhancing learning-to-learn. This technical problem is solved by the herein disclosed embodiments as depicted in the independent claims.

The embodiments comprise a computer system, a computer-implemented method and a computer program product. The herein disclosed self-adaptive computer system integrates the mechanics of an action video game—enhancing attentional control and learning-to-learn—with additional game-modules targeting to-be-trained specific brain functions of the user. Overall, the training experience can be broken down into periods where the specific brain functions are trained via game modules, and transitions from one game module to the other occur via a period of action video game play. In doing so, the herein disclosed architecture of a video game computer system leverages the fact that action video game play facilitates attentional control and in turn learning-to-learn, allowing a greater transfer of the specific brain processes trained by each game module to activities beyond the exact module played. Thereby, the proposed system takes advantage of the natural integration of these different aims through a story-based adaptive mechanism whereby the game-modules presented are uniquely determined by both the brain processes targeted by the application and the strengths and weaknesses the system detects from the gaming performance of a particular user. At the heart of the approach is a method for automatically adapting difficulty levels of a video game in relation to the user's gaming performance. In particular, this method can be applied by each video game module so that the video game system always adapts itself such that a proper difficulty level is provided to the user. The proper difficulty level is set automatically based on the user's gaming performance such that the user is challenged to improve the learning-to-learn capability, but is not overburdened by the current difficulty level of the video game.

The computer-implemented method embodiment for automatically adapting difficulty levels of a video game for a user firstly captures the user's gaming performance while the user is exercising with the video game on a respective computer system. For example, the system may capture the user's current gaming performance in real-time based on predefined performance metrics for assessing winning streaks and losing streaks generated by the respective video game. Winning streaks and losing streaks reflect the user's current gaming performance while exercising with the respective game. Thereby, winning streaks are runtime events generated in response to the user providing a succession of correct game answers without error, and losing streaks are runtime events generated when the user's performance drops under a pre-set level for a given duration. Other methods for capturing the user's gaming performance may be implemented by a person skilled in the art. The system advantageously captures the gaming performance of the user by gaming period (gameplay period), and stores the captured gaming performance values by gaming period in a performance history. In one embodiment, performance values in relation to a particular aspect of the video game may be computed as weighted average performance values over a plurality of gaming periods with the weight decreasing from the current period to the earliest period in the plurality of gaming periods. In other words, when computing a current performance value, the user's past performance is taken into account but the contributions of earlier periods have less weight than contributions from the current and more recent gaming periods.

The captured gaming performance is then used to generate a proper setting for the difficulty level for said user. The generation of the proper setting may even be accomplished at runtime while the user is executing the video game. Such a setting includes a plurality of level dimensions for the respective main level with each level dimension being associated with a different aspect of the user's gaming performance. For example, the video game may have n main levels which are defined by respective number of objects to be tracked by the user. In a lower main level, there are less objects to be tracked than in a higher main level. Each level dimension has a plurality of dimension-specific sub-levels defining a current position in a multidimensional sub-level space. For example, the level dimensions of a main level may include the speed of the objects being tracked, the number of distractor objects, and the tracking time (duration). Each level dimension has a plurality of sub-levels for the respective dimension. The number of sub-levels may be different for each level dimension.

To adapt to the difficulty level to the user's current condition, the system uses a probabilistic approach to explore the dimension-specific sub-level depending on two main elements: the gaming performance of the user (e.g., the ratio of correct trials over a predefined number of past trials) and the current status of the exploration which corresponds to the current position in the multidimensional sub-level space of the current main level. For this purpose, the system stores rules which define level-switch regions in the multi-dimensional sub-level space. A level-switch region is a combination of sub-level threshold values for each level dimension which indicates a region in the multi-dimensional sub-level space which indicates a performance of the user that allows for a switch to a next main level. In cases where the user's gaming performance falls into a low-performance level-switch region, the system may switch to the next lower main level with a certain probability. In case the user's gaming performance falls into a high-performance level-switch region, the system may switch to the next higher main level. However, even with the current position being inside a switch-level region, the system does not necessarily switch to a next main level. It may also switch to another sub-level or even maintain the current sub-level state (i.e., the current position) with respective probabilities.

In other words, if the current position in the multi-dimensional sub-level space is within a rule-defined level-switch region, the system uses a first probabilistic process to switch the main level or to switch one of the sub-levels in accordance with the user's gaming performance. A predefined probability vector is selected based on the user's gaming performance with switching probabilities greater than '0' for increasing or decreasing the main level in accordance with the rule-defined level-switch region, and for increasing one of the sub-levels, for decreasing one of the sub-levels, and for maintaining all sub-levels. The probabilities in the probability vector may be predefined as a combination of fixed probability values for switching the main level, switching a sub-level and maintain all levels, with different combinations being mapped to different positions in the multi-dimensional sub-level space. The probabilities may also be determined dynamically based on a probability determination rule set.

If the current position is outside the rule-defined level-switch region of the multi-dimensional sub-level space, only sub-level switches are allowed within the current main level. For this purpose, the system uses a second probabilistic process to switch one of the sub-levels in accordance with the user's gaming performance. In this case, a further predefined probability vector is selected based on the user's gaming performance with switching probabilities greater than '0' for increasing one of the sub-levels, for decreasing one of the sub-levels, and for maintaining all sub-levels, whereas the switching probability for increasing or decreasing the main level equals '0'. The first and second probabilistic processes may be implemented in a single function with respective switching probabilities set to zero depending on where we the current position is in the space of main and sub-level possibilities.

Both, the first and the second probabilistic process, have a probability greater than '0' that one of the sub-levels will be switched. For example, the system could always select the sub-level which has the greatest relative distance from its maximum value. Alternatively, a to-be-switched sub-level might be selected randomly. However, advantageously the system uses a third probabilistic process to determine the one sub-level to be switched. Thereby, the probability to determine the current sub-level of a particular level dimension depends on the distanced of the current sub-level value to the maximum sub-level value of the particular level dimension (i.e., d=maximum sub-level value−current sub-level value) in comparison to such distances for the other level dimensions of the current main level. To facilitate the comparability of the distances for the various level dimensions, it can be advantageous to use a relative distance value (the distance between current sub level and maximum sub-level value in relation to the entire sub-level range).

A particular rule may compute a rule-defined level-switch region which defines a threshold for each level dimension based on the maximum sub-level value for the respective level dimension. The rule may further define a combination of delta values to be added to the corresponding thresholds resulting in corresponding boundary values for each level dimension. The region between the boundary values and the respective maximum sub-level values forms a rule-defined level-switch region for difficulty level increase.

In one embodiment, there can be additional level dimensions which are not under the control of the probabilistic processes. Such additional level dimensions are referred to as fixed parameters herein. The sub-level values of such fixed parameters have thresholds which are updated dependent on the main level. That is, when the main level is increased, the threshold(s) of such fixed parameter(s) is(are) increased to. The increase may be by a fixed sub-level increment or it may be defined by a dynamic rule. For example, at lower main levels the threshold may be increased by two sub-levels when switching to the next main level whereas above a certain main level the threshold increase may only be by one sub-level. This allows to provide a more granular control of the difficulty level, and to allow, for example, high-performing users to move faster in low levels.

For difficulty level decrease the situation is inversed. A particular rule computes a rule-defined level-switch region which again defines a threshold for each level dimension. However, in this embodiment, the thresholds are based on the respective minimum sub-level value for the respective level dimension. The rule further defines a combination of delta values to be subtracted from the corresponding thresholds resulting in corresponding boundary values for each level dimension. The region between the boundary values and the respective minimum sub-level values forms a rule-defined level-switch region for difficulty level decrease. In a simplified version, the rule-defined level-switch region for difficulty level decrease corresponds to the position where all sub-levels have reached the minimum sub-level value.

In one embodiment, the system can adjust the current difficulty level to a not-yet-explored combination of sub-levels of the next lower main level if an exploration event is generated by the respective video game. For this purpose, the system may pseudo-randomly force the exploration of unexplored sub-levels of the previous main levels, for example, every $n^{th}$ update period (gaming period). This event is also referred to as "rollback" hereinafter. This event is aimed at exploring new sub-levels at easier difficulty levels of play, that might otherwise never be explored so that all training options for improving the user's learning-to-learn capability can be exploited. As a result, when the system calls for a rollback, for the duration of the next update period, the difficulty level is set to an unexplored set of sub-levels of the previous (next lower) level.

The described method for self-adaptation of difficulty levels of video games can be executed by the embodiment of a self-adaptive computer system for automatically adapting difficulty levels of video games to improve the learning-to-learn capability of a user. The self-adaptive computer system is based on an architecture with modules implemented by software as described in the following.

The system has a plurality of video game modules. Each game module is adapted to train the learning-to-learn capability of the user. Examples of brain functions to be trained by a particular game module when training the learning-to-learn capability of the user include, but are not limited to: Sustained attention, Divided attention, Updating, Problem Solving and Planning, Selective attention, Cognitive flexibility, and Attentional tracking. A person skilled in the art may include game modules which are targeting other brain capabilities which may also be relevant to the training of the learning-to-learn capability of the user. Further, each game module is configured to capture the user's gaming performance while exercising with the respective game module. As described above, methods for capturing the user's gaming performance are known in the art. Each of the game modules is adaptively selectable for interaction with the user. That is, the user interacts with the game modules one at a time because only one game module can be active at a given point in time (i.e., only one game module is executed by the system at a given point in time).

The system further has a training path module to select a particular game module based on one or more brain training goals for said user. For example, such a training goal can be "learning to read". Further, the training path module can adjust the duration of the selected game module for a future game session based on the user's gaming performance. That is, the user's performance determines the duration he/she will experience for each of these game modules (when selected), ensuring scaffolded learning as needed. In summary, the training path module can use one or more brain training goals for selecting a subset of game modules. It can determine the duration during that the user is exposed to each of the game modules in the selected subset based on the user's current gaming performance, and it can determine the order in which the game modules of the selected subset are presented to the user based on a story context of the action video game. For example, the training path can allocate a larger duration for a particular game module of the subset for next quest of the user if the user's current gaming performance falls below a given target performance, or it can allocate a shorter duration for a particular game module of the subset for a next quest of the user if the user's current gaming performance exceeds a given target performance; or it can remove a game module from the selected subset for the next quest if the allocated duration of the game module has reached a given minimum duration value. A quest is a task or a set of tasks that a game character which is controlled by the user needs to complete in order to gain rewards. Quests are linked together to form quest series or chains. This mechanism is used to advance the game plot.

Further, the system has an action video game hub module to provide an action video game with action-mechanics to the user. The action mechanics is adapted to engage the user into human-computer interaction in alternation with adaptively selected game modules. Also, the game hub is configured to capture the user's gaming performance while executing the action video game. In gaming terminology, an action video game hub bears key characteristics of action video games, and in particular a load on pacing and the necessity to shift between divided and focused attention at proper times. The hub serves as a gateway for the satellite game modules. It is designed to enhance attentional control and facilitate learning-to-learn or the generalization of what is learned in the game modules.

That is, each game/hub module has an integrated performance module for capturing the user's gaming performance while exercising with the respective video game.

The training path also integrates the game hub with the game modules in a modular development of a game story. The game story is used for the selection of game modules, wherein their order and their "allocated times" are computed in order to adapt the presented game modules, their frequencies and their durations as a function of the user's performance. For example, if in the previous game session (mission), the user had a lower performance in a game module training inhibitory control, the system can allocate a larger amount of time for this game module in the next mission. Vice versa, if the user strongly improved in a game module training the span of working memory, the system will allocate a smaller amount of time that game module for the next mission. If the allocated time for a particular game module reaches the minimum duration, then the system may even remove this particular game module from the lineup of the respective mission.

A database of game modules may be structured by regrouping game modules training the same brain process together in a sub-section of the database. The training path can then draw one game module from the sub-section corresponding to the brain process to be trained (i.e., dependent on the training goal). Thereby, further variability during training can be enforced. Such variability is advantageous for both enhancing learning-to-learn and greater compliance from the user/patient. According to the World Health Organization, patient compliance with treatment is defined as the extent to which a person's behavior taking medication, following a diet and/or executing lifestyles changes corresponds with agreed recommendations from healthcare providers.

Further, the system includes an incentive-motivation module to provide information for the user how earned points can be redeemed. A further function of the incentive-motivation module is to allow the user to discover a next quest to which the user gets assigned, and to send the user back to the action video game hub (or to a corresponding game module) with the next quest. In gaming terminology, the incentive-motivation module bears key characteristics of an incentive world, where the users discover how points earned during the rest of the gameplay can be redeemed and where opportunities are given to personalize his/her world. The users also discover the next quest they are assigned to and are sent back into the game hub to explore a new part of the game world. Through this mechanic, users get to experience again the various game modules and the core action video game hub activities.

The hub module and each game module are adapted to generate a proper setting for the respective difficulty level for said user. To achieve this, each of the hub/game modules has a respective level adjustment function with implements the first and second probabilistic processes as described above in the context of the computer-implemented method for automatically adapting the difficulty levels for the respective modules. In other words, when the system executes a level adjustment function of a particular module, the first and second probabilistic processes are executed by said level adjustment function accordingly for probabilistically switching the main level or a sub-level to arrive at a proper difficulty level setting for the user with an appropriate main level and an appropriate position in the multidimensional sub-level space of the respective main level.

For allowing the performance modules of the hub/game modules to compare the user's gaming performance with the current position in the multi-dimensional sub-level space, the user's gaming performance is captured with a dimension-specific performance value for each level dimension. For example, the dimension-specific performance values may be computed as weighted average performance values over a plurality of gaming periods of the user with the weight decreasing from the current period to the earliest period in the plurality of gaming periods.

In one embodiment, the hub/game modules capture the user's current gaming performance in real-time based on predefined performance metrics for assessing winning streaks and losing streaks generated by the respective game or the hub module reflecting the user's current gaming performance while executing the respective game or hub module. Therefore, advantageously, the gaming performance of the user is captured by gaming period, and the captured gaming performance values by gaming period are stored in a performance history from where they can be retrieved when assessing the user's current gaming performance in relation to the user's performance in the past.

The level adjustment functions for the various modules may also implement all optional features of the above-described computer-implemented method. In particular, the first and second probabilistic processes may also include a third probabilistic process for a probabilistic determination of the one sub-level to be switched as described earlier. Also, the above-described rule defined level-switch regions used for difficulty level increase/decrease may be implemented by the level adjustment functions, wherein the thresholds for each level dimension may be updated dependent on the main level in the case difficulty level increase. Further, the level adjustment functions may implement the above-described rollback function where the current difficulty level of a module is adjusted to a not-yet-explored combination of sub-levels of the next lower main level of said module if an exploration event is generated by the respective video game.

Further aspects of the description will be realized and attained by means of the elements and combinations particularly depicted in the appended claims. It is to be understood that both, the foregoing general description and the following detailed description are exemplary and explanatory only and are not restrictive.

DETAILED DESCRIPTION

Figure 1:
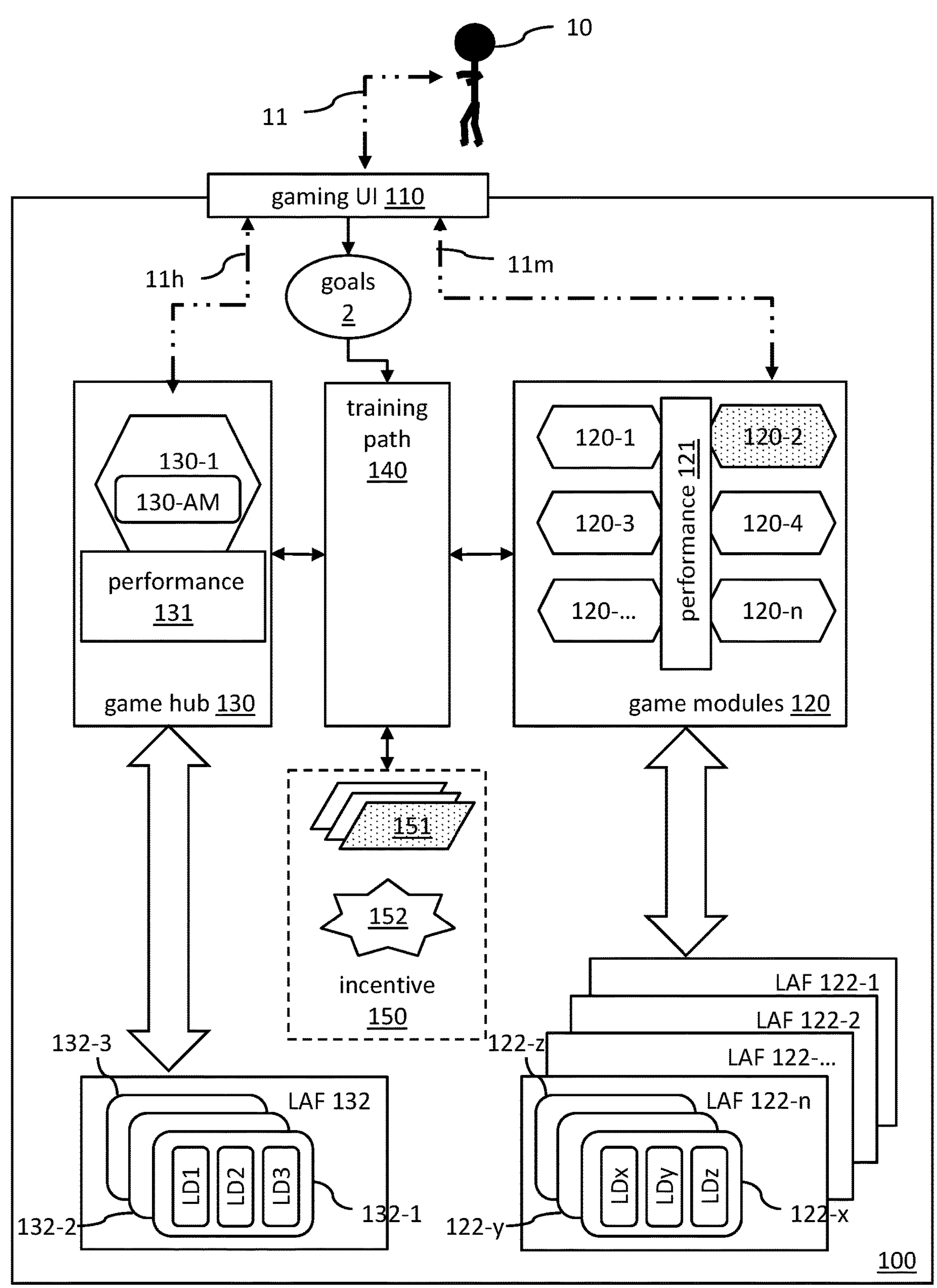
FIG. 1 shows a simplified diagram of an embodiment of a self-adaptive computer system for automatically adapting difficulty levels of video games to improve the learning-to-learn brain capability of a user according to an embodiment.
Figure 2:
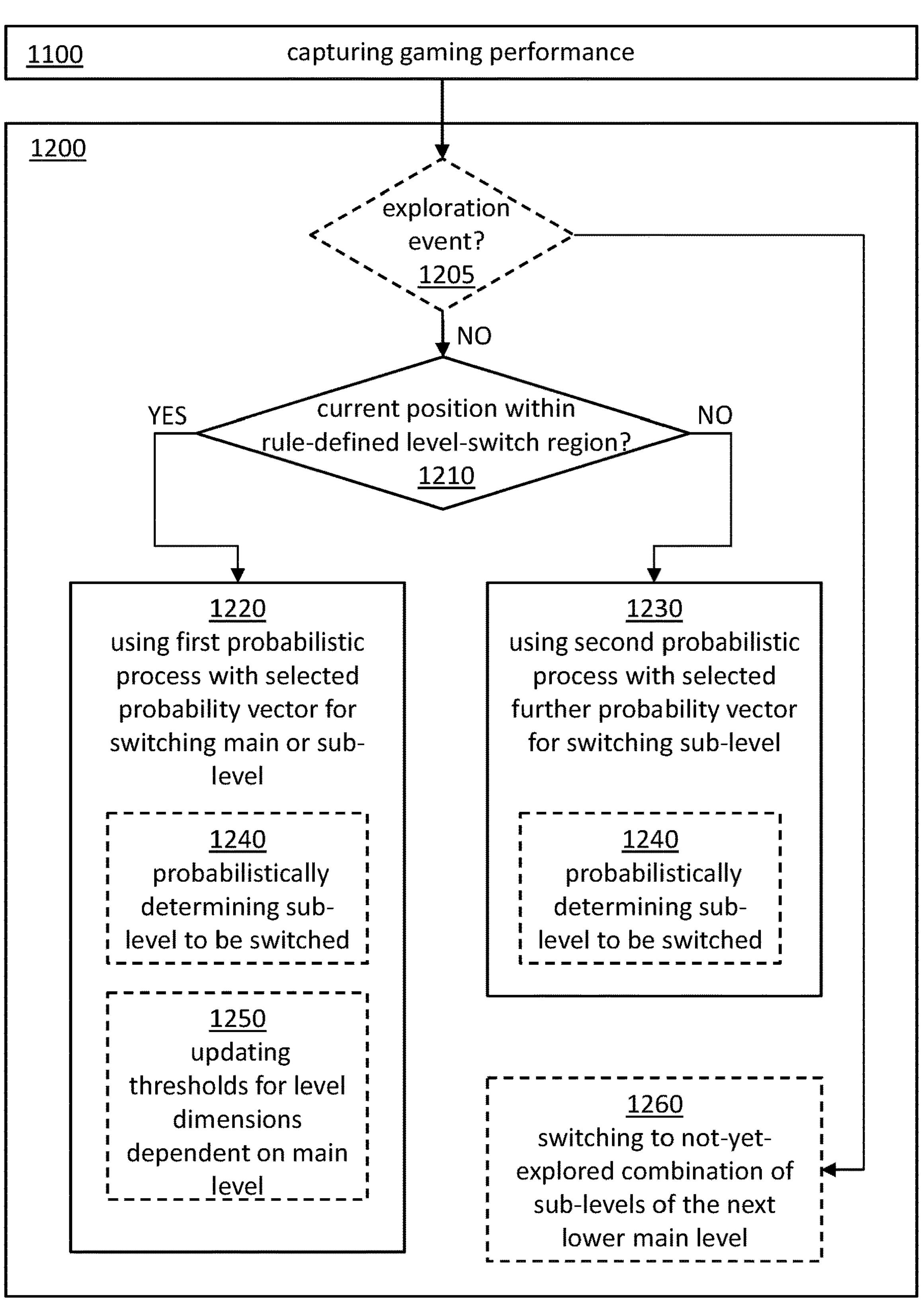
FIG. 2 is a simplified flowchart of a computer-implemented method for automatically adapting difficulty levels of a video game for a user in relation to the user's gaming performance which can be performed by embodiments of the computer system.

FIG. 1 shows a simplified diagram of an embodiment of a self-adaptive computer system 100 for automatically adapting difficulty levels of video games to improve the learning-to-learn brain capability of a user 10. FIG. 2 is a simplified flowchart of a computer-implemented method 1000 for automatically adapting difficulty levels of a video game for a user 10 in relation to the user's gaming performance. The method 1000 can be performed by embodiments of the computer system 100. Therefore, FIG. 1 is described in the context of FIG. 2 and the following description refers to reference numbers of both figures.

System 100 and method 1000 are described by way of example referring to specific hub/video game modules. However, the particular examples described herein are not to be interpreted to be limiting for the scope of the description as claimed. Rather, a person skilled in the art of video game development will be able to choose the appropriate game modules for achieving the learning-to-learn brain capability improvement of the user 10.

The user 10 interacts 11 with the system 100 via a gaming user interface (UI) 110. Gaming UIs are known in the art and can make use of different control mechanisms for the video game. Simple UIs just use the mouse and keyboard to launch gaming control signals. More advanced UIs may use joy sticks or video game consoles to allow the user improved control of the video game.

The system 100 includes an action video game hub module 130 providing an action video game 130-1 with action-mechanics 130-AM to the user 10. Via said UI 110, the user can interact 11*h* with the hub module 130. The hub module 130 further has a performance function 131 for capturing 1100 the user's gaming performance when executing the action video game 130-1. In one implementation example, the hub module 130 implements an action video game 130-1 which requires visuo-motor coordination to move the user's avatar through a complex path by avoiding obstacles, aiming at them to weaken them, and collecting rewards. The function trained by the action video game is the divided attention of the user combined with flexible switches to a focus attention state as the task requires high precision. The main level is defined by the type of enemies of the user's avatar. The sub-levels in three level dimensions are defined by: speed, density, and the type of sub-categories of enemies displayed (i.e., different trajectories and dynamics). The update period may be set to once per game play.

Further, the system 100 provides a plurality 120 of video game modules 120-1 to 120-*n*. Each game module is adapted to train the learning-to-learn brain capability of the user 10. Examples of trained functions which support to improve the learning-to-learn brain capability are given below when explaining examples for the game modules and the action hub module. Similar to the hub module, each game module has a performance function to capture the user's gaming performance while executing the respective game module. The game modules are adaptively selectable for interaction 11*m* with the user 10 and are provided to the user in alternation with the action video game. That is, each time the user has gone through a play period of the action game, the system selects one of the game modules and continues with the selected game module. Once the user has gone through a predefined number of trials with the selected game module, the system returns again to the action video game of the hub module, and so on. Thereby, action video games share (1) a fast pace (i.e., pacing or the need for making decisions under time pressure), (2) a load on divided attention or the need to sustain attention over a large part of one's environment, (3) the need to switch between this latter divided attention state and a more focused attentional state (as required by precise aiming in shooter game for example) as a function of the ever-changing game contingencies; (4) the need for prediction (the activities need to be structured enough that one can learn through trial and errors), and (5) the need for variability of the activities.

The training path module 140 is responsible for the adaptive selection of the game modules. The training path module 140 selects a particular game module 120-2 based on one or more brain training goals 2 for said user. The selected module 120-2 is illustrated with a doted background. Further, the training path 140 adjusts the duration of the selected game module 120-2 for a future game session based on the user's gaming performance. The training path integrates the hub module 130 with the other game modules 120 in a modular development of the story: the selection of games, their order and their "allocated time" are computed in order to adapt the game modules, the frequency at which they are selected and their durations as a function of the users' performance.

In the following, examples of hub/game modules are described which can be used by the system to improve the user's learning-to-learn function. Thereby, each hub/game module supports another trained function. To achieve the desired learning-to-lean improvement, the combination of the trained functions should be provided by the hub/game modules. However, hub/games modules which support the same trained function are interchangeable for a skilled person. Therefore, the following example with a hub module and 9 exemplary game modules may be replaced by other hub/game modules providing the same trained functions. Each hub/game module supports a plurality of difficulty levels for the user. Thereby, the main level is a parameter used to manipulate game difficulty at a coarse scale. Each main level value identifies a multi-dimensional space with level dimensions for manipulating game difficulty at a fine-grained scale. The multi-dimensional space can be implemented via a respective matrix. Each level dimension has sub-levels to manipulate the game difficulty at such fine-grained scale. In addition, fixed parameters may be used within a main level. The thresholds for fixed parameters with regard to difficulty level increase are dependent on the main level and independent of the respective sub-levels.

The above-described example scenario is appropriate to improve, for example, the reading capabilities of the user 10 who gets engaged with the action video game 130-1 with the above-described action-mechanics 130-AM in alternation with the adaptively selected game modules 120.

The herein disclosed self-adaptive system architecture with an action video game hub alternating with other game modules can also be used to treat brain-related issues or brain dysfunctions of patients. For example, the adaptively selectable game modules can be adapted to provide training functions which are appropriate to help patients overcoming a depression. Major depressive disorder (MDD) is a common disorder among adults and it is often associated with cognitive deficits. Specifically, individuals with depression show deficits in several executive functions including attentional control as well as in processing speed which in turn predicts low functional outcome as well as low level of treatment responsiveness. Since depression is frequently resistant to antidepressant treatment and psychotherapies have often limited effects, computerized cognitive training paradigms of attentional control and learning-to-learn offer a promising tool to improve patients' attentional control, ability to use their cognitive and emotional resources to reappraise their emotion, and thus benefit in their mood and everyday functioning.

With this aim, an alternative version of the game can be provided to patients with depression. The proposed approach does not only target the underlying cognitive deficits often associated with depression, but also to do so in a manner that is engaging and engenders adherence to treatment protocol.

In the following, eight game modules are described with their respective level dimensions to address training functions targeting learning to learn capability of the user. These eight game modules can be seen as a core set of game modules which is present in any treatment scenario to treat brain-related issues or brain dysfunctions of the user. The primary sub-processes upon which each task is loading are described, even though these tasks are mediated by a complex combination of different executive functions. In addition, the level dimensions and update periods are described for each game module. The eight game modules are provided to the user alternating with the hub module.

In this example, the above-described hub module example, with the action video game (with the previously described properties shared by action video games) is complemented by the following eight game modules (specifying an example core game module set) which are alternately selected with the action video game.

1) The user is asked to keep track and identify a subset of moving objects around the screen, some being initially tagged as targets and others acting as distractors. The trained function is attentional tracking. The main level is defined by the number of targets and the sub-levels of the level dimensions are defined by:

the number of distractors, the tracking time, as defined by gameplay period with no visual distinction between targets and distractors, and the speed of the objects being tracked.

Fixed parameters are:

the distinctiveness of the objects with respect to the background, the presentation time of the targets, and the maximum response time.

The update period may be set to four trials.

2) The user is required to control both the protagonist and another character (e.g., an animal), while jumping and avoiding multiple obstacles with both characters. The trained function is divided attention. The main level is defined by the speed of the characters. The sub-levels of the level dimensions are defined by the:

speed of the incoming background obstacles, size of the background obstacles, density of the background obstacles, distance between jumping platforms, and probability that the platform starts collapsing.

The update period may be set to 7.5 seconds.

3) The user is presented with a series of symbols, one after the other, and he/she is asked to reproduce the last N symbols presented. The trained function is Updating as implemented in the visual modality. The main level is defined by the number of symbols to reproduce. The sub-levels of the level dimensions are defined by the:

the time during which a single symbol is shown to the user.

A fixed parameter is the maximum response time.

The update period may be set to four trials.

4) The user is presented with series of symbols presented in a tiling: the task is to reproduce both symbols and their order of presentation. At first, every tile shows a symbol and then, the symbols disappear, and the tiles are illuminated, one by one, forming a path. The trained function is Updating. The main level is defined by the tile dimension (e.g., 2×2, 3×3). The sub-levels of the level dimensions are defined by:

the complexity (variety of symbols) of the tiling, and the fixed parameter maximum response time.

The update period may be set to one trial.

5) The user's goal is to solve a series of puzzles based on physics mechanics. The user has access to various objects to modify the canvas in such a way that the target object (e.g., a glowing ball), starting from the entry point, will end up reaching the exit point. The system offers clues on how to place those objects after a set time of discovery. The trained function is Problem Solving and Planning. The main level is defined by the number of steps to solve the puzzle.

Fixed parameters are:

complexity (variety of objects) of the response set, and complexity (variety of obstacles.

The update period may be set to one trial.

6) The user has to anticipate the trajectories of certain characters (e.g., sentinels) and he/she is required to aim at them. The trained function is Selective attention. The main level is defined by the speed of sentinels. The sub-levels of the level dimensions are defined by the:

total number of sentinels, maximum response time, and total duration of a session.

The update period may be set to one trial.

7) Firstly, a card with the target symbol on it is shown to the user, secondly up to six cards displaying other symbols are added to the screen and thirdly the cards are covered, and they start to shuffle. The aim of the user is to follow and ultimately identify the target card among other, identical covered cards. The trained function is Attentional tracking. The main level is defined by the number of cards. The sub-levels of the level dimensions are defined by the:

number of movements (shuffles), maximum response time, and presentation time.

The update period may be set to one trial.

8) Stimuli are asymmetrical animals that are arranged in arrays/clusters of N animals. A target stimulus is presented surrounded by distractors, which are animals presented in the opposite direction than the target. The user needs to focus on the animal positioned in the middle and quickly indicate the direction it is facing. The trained function is Inhibitory control. The main level is defined by the time during which a single stimulus is shown to the user. The sub-levels of the level dimensions are defined by:

the distance from the center of the screen of the target and the additional figures, the size of the target and the additional figures, the luminosity of the target and the additional figures, the maximum response time, and the interstimulus time.

Fixed parameters are defined as:

the probability of congruent stimuli, the number of the additional figures, and the disposition of the additional figures.

The update period may be set to four trials with level-up thresholds for the fixed parameters of 20%, 25%, 30%, 35% and 40%.

In other words, the basic settings for the hub module and the game modules includes the hub module providing an action video game in accordance with the above describe action video game properties (the action video game may require—for example—visuo-motor coordination to train the user's brain function "divided attention combined with flexible switches to a focus attention state as the task requires high precision"), and further includes a core set of game modules exercising the following brain functions: Sustained attention, Divided attention, Updating, Problem Solving and Planning, Selective attention, Cognitive flexibility, and Attentional tracking.

The following two game modules can be added to the above set of eight core game modules to tailor the video game system for particularly improving sound processing, a needed skill for reading:

9) The user is required to memorize sounds emitted by the game module, and answer by selecting the symbols corresponding to the last n sounds of the series. This game module is a simplified version of game module 3) based on auditory stimuli. Only three types of sounds are used: a low, a medium and a high pitch sound, each one being associated with a symbol. The trained function is Updating in the context of auditory processing. The main level is defined by the number of sounds to keep track of. The sub-levels of the level dimensions are defined by:

the time during which a single sound is shown to the user.

A fixed parameter is the maximum response time.

The update period may be set to one trial.

10) The user is instructed to respond every time when hearing a frequent "Go" sound and to withhold response to any "no-go" sounds, which are less frequently presented. The go-stimuli are more frequent (e.g., 80%) than the others (e.g., 20%) in order to induce a prepotent response. The trained function is Inhibitory control in the context of auditory processing. The main level is defined by the time during which a single stimulus is shown to the user. The sub-levels of the level dimensions are defined by the:

go/no-go probabilities, and the interstimulus interval.

A fixed parameter is the maximum response time.

The update period may be set to four trials.

That is, in the embodiment for improving the reading capability of the users, game modules are added to the core set of game modules providing video games which are adapted to the additional brain functions called upon by reading (i.e., auditory processing).

The following further additional game modules can be added to the above-described eight core game modules to tailor the video game system for particularly improving positive mood which is fundamental in treating people with depression:

11) The user is presented with emotional stimuli consisting of different facial expressions. These are presented one at a time in a sequence. Once presented, the task is to decide if the current stimulus matches the one presented with a specific number of steps back (termed N-back) in the sequence. The trained function is Updating in the context of positive valence facial emotion. The main level is defined by the number of steps back. The sub-levels of the level dimensions are defined by:

the type of emotional stimuli, the presentation time, the interstimulus time, and the maximum response time.

Fixed parameters are defined as:

the probability of the same emotional stimuli occurring in the sequence.

The update period may be set to four trials with level-up thresholds for the fixed parameters of 70%, 75%, 80% and 85%.

12) The user is asked to respond every time they see a go-stimulus (e.g., positive and neutral green faces, positive white faces) while ignoring the no-go-stimuli. The go-stimuli (e.g., 80% of stimuli) are more frequent than the others (20% of stimuli) in order to induce a prepotent response. The trained function is Inhibitory control in the context of positive valence facial emotion. The main level is defined by the time during which a single stimulus is shown to the user. The sub-levels of the level dimensions are defined by:

the white/non-white stimulus probabilities, the go/no-go probabilities, and the interstimulus interval.

Fixed parameters are defined as:

the maximum response time.

The update period may be set to four trials with level-up thresholds for the fixed parameters of 40%, 50% and 60%.

Game module 12) is an adaptation of game module 10. Instead of auditory stimuli (specifically designed to train reading), emotional stimuli are used to train attentional control.

That is, in the embodiment for the treatment of depression patients, further game modules are added to the core set of game modules providing video games which are adapted to the brain functions: Inhibitory control (motor response) and Updating (visual modality). In general, for depression treatment, additional game modules of a depression embodiment are targeting these brain functions using emotional stimuli (which are typically not part of the reading embodiment). In other words, this adapted version loads on emotional-cognitive control and interference management through several activities during the game play that include emotional stimuli.

The herein disclosed self-adaptive computer system can also be adapted for stroke patients. For this purpose, another set of game modules can be used with simplified response execution and a large number of uni-manual response options. The two primary motor impairments that hinder function after stroke are declines in strength and motor control.

The system 100 further has an incentive-motivation module 150 to provide information 152 for the user 10 how earned points 152 can be redeemed, and to discover a next quest 151 to which the user 10 gets assigned. Once the next quest has been identified, the user 10 is sent back (via the training path 140) to the either the action video game hub 130 or to a corresponding game module 120-1 to **120-*n* with the next quest 151 to explore so far unexplored parts of the game. The incentive-motivation module 150 allows for a seamless transition between the alternating hub module and the adaptively selected game modules from the user's point of view, with the gameplay being situated in an adventure world as in a typical entertainment video game, and unlike what is typical of brain training tools. For this purpose, the incentive-motivation module incentivizes the user and allows a safe space where participants can personalize their game play experience by redeeming the accumulated wealth, they have built during the other parts of the game play (when exercising with the action video game 130-1 or any of the other game modules 120-1 to 120-*n***).

An important aspect for improving the learning-to-learn capability of the user is that the user 100 is guided through the game in such a way that the user is neither unchallenged nor overwhelmed by the current difficulty level of the game. To allow such an improvement little by little, it is highly advantageous to have a fine granular adjustment of the difficulty level which is always appropriate with regard to the captured gaming performance of the user. For this purpose, the hub module 130 and each game module (120-1 to **120*n*) implement respective level adjustment functions LAF 132, LAF 122-1 to LAF 122-*n* which generate 1200 a proper setting for the respective difficulty level for said user based on the user's current performance. Each setting comprises a plurality of level dimensions for a respective main level, with each level dimension being associated with a different aspect of the user's gaming performance. In the example of FIG. 1, the level adjustment function LAF 132 of the hub module 130 has three main levels 132-1 to 132-3. The main level 132-1 has three level dimensions LD1 to LD3. The other main levels may have different level dimensions. Each level dimension has a plurality of dimension-specific sub-levels defining a current position in a multidimensional sub-level space of the respective main level. The same is true for each game module. In the example, the level adjustment function LAF 122-*n* of the game module 120-*n* has three main levels 122-*x* to 122-*z*. Main level 122-*x*** has three level dimensions LDx to LDz.

Figure 3A:
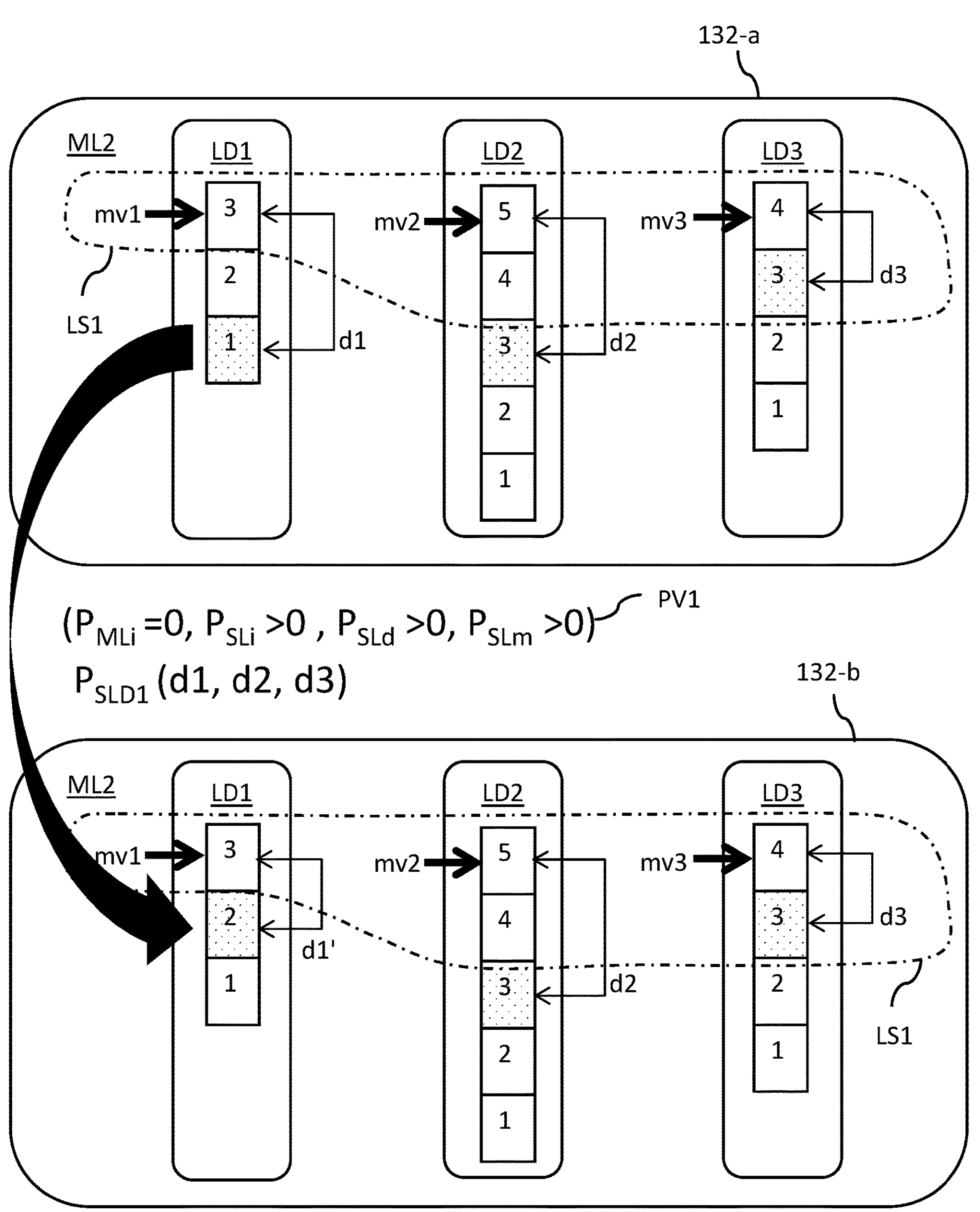
FIGS. 3A, 3B illustrate examples of probabilistic adjustment of the difficulty level according to some embodiments.
Figure 3B:
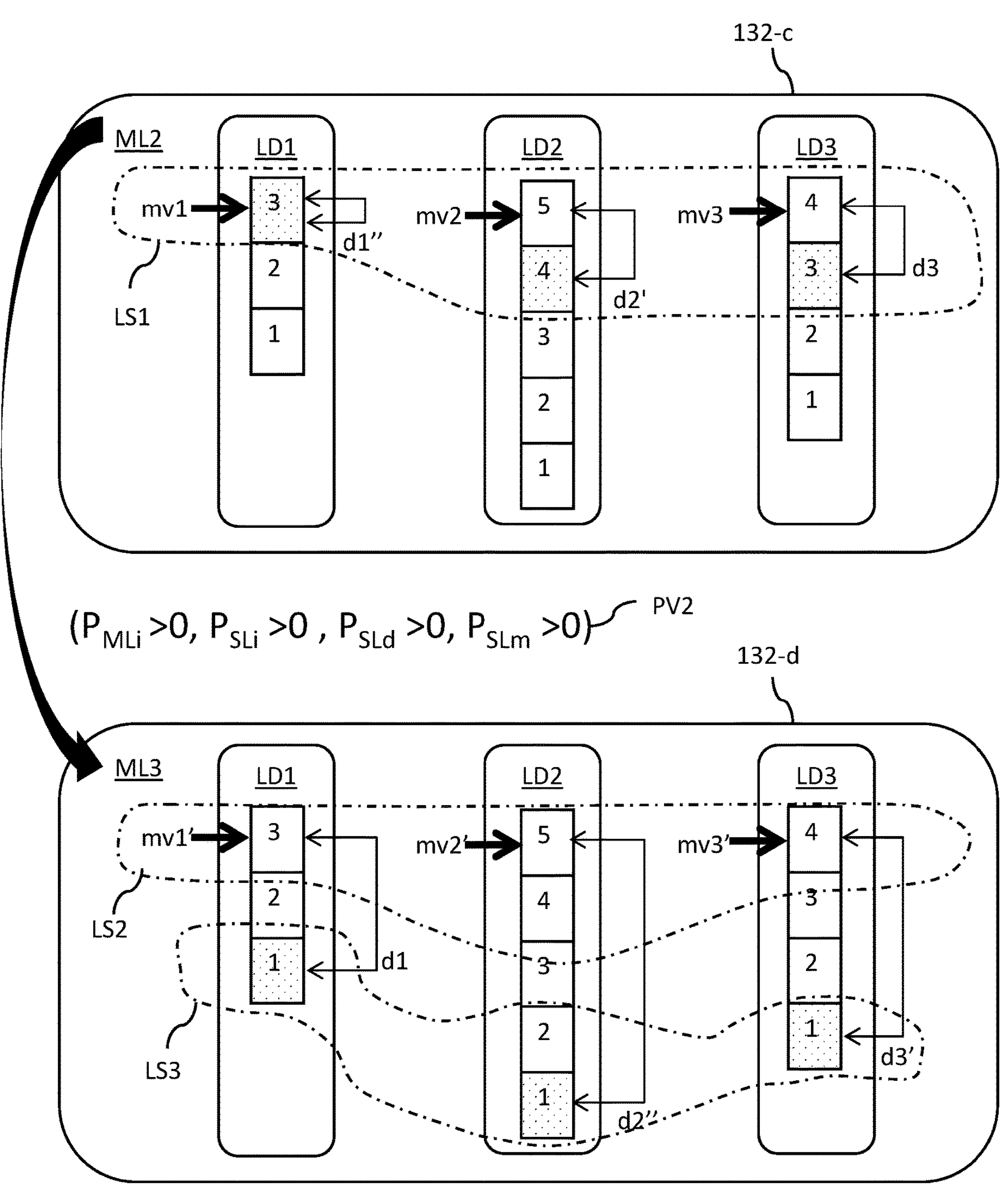

The details of the generation 1200 of an appropriate difficulty level are now explained in the context of FIGS. 3A and 3B. The level adjustment functions of the hub/game modules implement a first probabilistic process 1220 to switch the main level or to switch one of the sub-levels in accordance with the user's gaming performance if the current position in the multi-dimensional sub-level space is within a rule-defined level-switch region LS1 of the multi-dimensional sub-level space. Further, they implement a second probabilistic process 1230 to switch one of the sub-levels in accordance with the user's gaming performance if the current position is outside the rule-defined level-switch region LS1 of the multi-dimensional sub-level space.

FIG. 3A illustrates an example of the second probabilistic process 1230 which finally ends in a sub-level increase within the level dimension LD1. In the upper part of FIG. 3A the current difficulty level 132-*a* is defined by the current main level ML2 and the current sub-levels 1, 3, 3 in the level dimensions LD1, LD2, LD3, respectively. The current sub-level within a level dimension is highlighted with a pointed filling pattern. In the example, the rule-defined level-switch region LS1 has been defined to as the following region within the multi-dimensional sub-level space: (LD1:3, LD2:4&5, LD3:3&4). That is, the current position (LD1:1, LD2:3, LD3:3) is outside the level-switch region LS1 because only the sub-level of LD3 falls into the region. However, for the current position is within the level-switch region LS1 only if all level dimensions have a sub-level inside the switch region. As the current position is outside the switch region, a switch of the main level is disabled. Only probabilistic sub-level switches are allowed. In other words, a predefined probability vector PV1 is selected based on the user's gaming performance with switching probabilities ($P_{SLi}$, $P_{SLd}$, $P_{SLm}$) greater than '0' for increasing one of the sub-levels ($P_{SLi}$), for decreasing one of the sub-levels ($P_{SLd}$), and for maintaining all sub-levels ($P_{SLm}$). The switching probability $P_{MLi}$ for increasing (or decreasing) the main level ML2 equals '0'. The level adjustment function will now switch one of the sub-levels or maintain all sub-levels with the respective probabilities set in PV1.

In one implementation, the level dimension to be switched may be selected randomly. In another implementation, the level dimension may be selected based on the distance d1, d2, d3 between the current sub-level and the respective maximum sub-level value mv1, mv2, mv3 in the respective level dimension. For example, the level adjustment function may select the level dimension with the largest relative distance (i.e., the distance divided by the maximum sub-level value).

In a more advantageous implementation, the level adjustment function uses a third probabilistic process 1240 to determine the sub-level to be switched. In this implementation, the probabilistic determination of the one sub-level to be switched is based on the probability $P_{SLD1}$ to determine the current sub-level of a particular level dimension. Thereby, $P_{SLD1}$ depends on the distance d1 of the current sub-level value LD1:1 to the maximum sub-level value LD1:3 of a particular level dimension LD1 in comparison to such distances d2, d3 for the other level dimensions LD2, LD3 of the current main level ML2. In the example, the relative distance for LD1 is larger than the relative distances for LD2 and LD3. That is, the probability for increasing the sub-level LD1:1 to the next sub-level is highest in case the user's gaming performance exceeds the gaming performance expected for the current position. It is to be noted that merely the probability for increasing LD1:1 is highest compared to the other level dimensions. Of course, in the probabilistic process, any of the other sub-levels could also be determined with the respective probability. In the example, it is assumed that the level adjustment function initially has decided to increase a sub-level (with probability $P_{SLi}$) and finally selects indeed sub-level LD1:1 based on $P_{SLD1}$. Difficulty level 132-*b* shows the result after the sub-level switch (illustrated by the bended arrow) where the sub-level has been increased to LD1:2. In this embodiment, two probabilistic processes are used to switch to a difficulty level which is appropriate in view of the user's current gaming performance, where firstly a probabilistic approach is used to determine whether a sub-level should be switched at all (i.e., increased or decrease) or whether the sub-levels should be maintained, and secondly, in case a sub-level is to be switched, a further probabilistic approach determines the sub-level to be switched as described above.

FIG. 3B illustrates the first probabilistic process 1220, which finally ends in an increase of the main level. In the upper part of FIG. 3B, the current position in the multidimensional sub-level space defining difficulty level 132-*c* is (LD1:3, LD2:4, LD3:3). That is, the current position in this case falls into the rule-defined level-switch region LS1. In this case, the system also foresees a switch probability for increasing the main level ML2. That is, the level adjustment function selects a predefined probability vector PV2 based on the user's gaming performance with switching probabilities ($P_{MLi}$, $P_{SLi}$, $P_{SLd}$, $P_{SLm}$) greater than '0' for increasing the main level ML2 ($P_{MLi}$), and for increasing one of the sub-levels ($P_{SLm}$), for decreasing one of the sub-levels ($P_{SLd}$), and for maintaining all sub-levels ($P_{SLm}$). It is clear for the skilled person that the first and second probabilistic processes can be implemented in a single function where for the first probabilistic process the main level switch probability is greater than '0', and for the second probabilistic process the main level switch probability equals '0'. In the example the level adjustment function finally decides, based on the probability vector PV2 to increase the main level to the next level ML3 (illustrated by the bended arrow). This results in the difficulty level 132-*d*. In this example, the new main level ML3 is has again the three level dimensions LD1 to LD3. It is to be noted that ML3 may use other level dimensions than ML2. After an increase of the main level all sub-levels of the respective level dimensions are set to their lowest values LD1:1, LD2:1; LD3:1. ML3 has a level-switch region LS2 which is again used as a threshold for increasing the main level if the user's gaming performance has reached a corresponding difficulty level. After the main level switch, each level dimension shows the maximum distance d1, d2", d3' between the current sub-level and the corresponding maximum sub-level values mv1', mv2', mv3'.

In the example, ML3 has a second rule defined level-switch region LS3 which represents a lower threshold used for decreasing a main level. That is, if the current position falls within LS3 (which is the case after the main level increase) and if the user's captured gaming performance is below the expected performance associated with difficulty level 132-*d*, a predefined probability vector PV2 would be selected based on the user's gaming performance with switching probabilities ($P_{MLd}$, $P_{SLi}$, $P_{SLd}$, $P_{SLm}$) greater than '0', where $P_{MLd}$ is the probability for decreasing the main level back to ML2. The example shows the switch-level region LS3 including the sub-levels (LD1:1, LD2:1, LD2:2, LD3:1). The general approach for defining LS3 as a level-down switch region can be similar to the approach for defining the level-up switch region LS2 where multiple sub-levels of a level dimension can be part of the level-switch region. However, for a level-down switch region it can be advantageous to only include the lowest sub-level of each level dimension.

Turning back to FIG. 2, in case the level adjustment function decides to switch a sub-level when applying the first probabilistic process 1220, the respective sub-level can be determined in the same way as described for the second probabilistic process 1230. In particular, the third probabilistic process 1240 may be used for determining the to-be-switched sub-level.

In one embodiment, the system 100 provides a further option for switching the difficulty level of the respective hub module or game module. In this embodiment, the system can generate exploration events. If such an exploration event is detected 1205, the level adjustment function may switch the difficult level for the next gaming period to a not-yet-explored combination of sub-levels of the next lower main level. Such rollback function may also be integrated into the first and second probabilistic processes. In such case, the predefined probability vectors also include a rollback switch probability and the level adjustment function decides for a rollback based on the respective switch probability.

In general, for all herein disclosed embodiments, the probabilities of the vector elements of a predefined probability vector always add up to '1'.

The fine-grained difficulty level adjustment, which has been generically described with FIGS. 3A, 3B, is now further explained by a specific game implementation example for game module 1) with the trained function of Attentional control. In the example implementation, game module 1) is a fishing game. The user is asked to keep track and identify a subset of targets (fish) as they move randomly around the screen.

The performance function of the game module may check the performance of the user at the end of every update period. An update period is defined as the number of trials after which the system re-computes the difficulty level to be adjusted accordingly for the update period. In the fishing game module, the update period corresponds to 4 trials.

The fishing game module has nine main levels which are defined by the number of objects to track (1 to 9 objects to track corresponding to the respective main level). Each level dimension comprises three dimension-specific sub-levels:

(S1) the number of distractors;

(s2) the tracking time (duration), and (s3) the speed of the objects being tracked.

The exploration of dimension-specific sub-levels depends on two main elements: the (gaming) performance of the user (i.e., the ratio of correct trials over the last 4 trials for the fishing game) and the current status of the exploration (i.e., the current position in the multidimensional sub-level space, or in other words the current sub-level values).

The performance determines the direction (up or down) across the sub-levels from the current place we are at in that multidimensional sub-level space. If the user has a low performance (e.g., only 1 correct trial out of 4) the system will have a high chance of moving down in sub-levels, with the aim of proposing a more suitable experience and avoid frustration of the user. If the user has a high performance (e.g., 4 correct trials out of 4) the system will have a high chance of moving to novel higher sublevels, or even to the next higher main level if the current position falls into the corresponding rule defined level-switch region.

A "high chance of moving up" means that among the three sub-levels that can be changed, it will be more likely to go up in one of the sub-levels than staying at the same sub-levels or going down in sub-levels. For example, corresponding predefined probability vector can present a 70% chance of increasing one of the sublevels, a 15% chance staying at the same sub-level, and a 15% chance of going down with one of the sub-levels. As mentioned earlier, all probabilities in the probability vector add to '1'.

Similarly, a "high chance of moving down" means that among the three sub-levels that can be changed, it will be more likely to decrease one of the sub-levels than staying at the same sub-levels or increasing in sub-levels. For example, the corresponding predefined probability vector may reflect a 70% chance of decreasing a sub-level (e.g., the last increased sub-level), a 15% chance of staying at the same sub-level, and 15% chance of going up in one sub-level. It is to be noted that when selecting a to-be-decrease sub-level, instead of selecting simply the last increased sub-level, also the earlier described probabilistic approach based on the relative distances in the level dimensions can be used.

In addition, in case the level adjustment function decides to move up in sub-levels, the to-be-increased sub-level can be determined in the following way: if two of the dimension-specific sub-levels are already high (e.g., S1 and S2 as measured in relative distance from their maximum sub-level values) and one of the sub-levels is still low (e.g., S3 still having a larger relative distance), there will be a low probability to increase these two sub-levels S1, S2 and a higher probability that instead the third dimension-specific sub-level S3 will be increased. In other words, the likelihood of exploring a novel, specific sub-level is determined by the probabilistic processes as described earlier.

In the fishing game example, the probability of moving up in a particular sub-level depends on the distance from its current value to its maximum value. For example, the three dimension-specific sub-levels S1, S2, S3 may have a maximum value of '10' and the current values may be at: s1='8', s2='6', s3='2'. Due to the fact that s1 and s2 have a rather high value compared to the maximum value, their probability of moving up will be lower (e.g., 10% and 20% respectively). On the other hand, the probability for moving up S3 is much higher (e.g., 70%—all probabilities need to add up to 100%). For this reason, for the next update the level adjustment function most likely will choose to explore S3 (i.e., increase the sub-level s3 from '2' to '3', but again all in accordance with these respective probabilities. This approach makes it possible for users to re-experience levels they have cleared (i.e., levels where the performance was equal or higher than the expected performance) and are comfortable with—but in small doses. Advantageously, for moving down in sub-levels, the level adjustment function may always move down the sub-level that was moved up last.

Winning streak and losing streaks can be used as a part of measuring the user's gaming performance and can trigger corresponding changes in the probability vector.

Winning streak: when the performance of the user is high (e.g., 4 correct trials out of 4), and has been so in a number of past update periods, for example in the past 5 update periods—that is, 20 correct trials in a row, the user has gained a winning streak. In these cases, the exact value of the probability of difficulty level increase for the next updated period gets increased as compared to the respective probability in the previous probability vector (as described earlier). So, for example, the previously presented probability vector (70% chances of increasing one of the sublevels, 15% chance staying at the same sub-levels, 15% chance of going down in one sublevel) may be change after a winning streak to (90% chances of increasing one of the sublevels, 5% chance staying at the same sub-levels, 5% chance of going down in one sub-level).

Losing streak: when the performance of the user is low (e.g., 1 correct trial out of 4) in the past 5 update periods (so on average no more than 5 correct trials over the past 20 trials for example), the user gained a losing streak. The exact value of the probability of difficulty level decrease for the next update period gets decreased as compared to the likelihood mentioned above, in order to slow down the decrease in difficulty and to not penalize the player. That is, the earlier probability vector (5% chance of going up in one sub-level, 90% chances of decreasing in sub-levels, 5% chance staying at the same sub-levels) would be replaced by corresponding predefined probability vector, such as (15% chance of going up in one sublevel, 70% chance of decreasing the last increased sub-level, 15% chance staying at the same sub-levels). For example, the predefined probability vectors can be retrievable from a respective look up table which stores triplets of data with a current probability vector, a subsequent probability vector and a corresponding gaming performance.

What has been describe for the fishing game example with regard to switching of sub-levels can be also applied to the switching of main levels when the current position falls into a switch-level region of the multidimensional sub-level space.

For each main level, a main-up-threshold rule defines one or more regions in the sub-level space where the difficulty can switch to another main level. In the fishing game example, the level adjustment function may for switch from 3 "fishes" to track (main level 3) to 4 "fishes" to track (main level 4), rather than just increasing one of the sub-levels. As already discussed, this is done probabilistically—when reaching one of these level-switch regions. Instead of having a probability vector according to the second probabilistic process (70% chance of increasing one of the sublevels, 15% chance staying at the same sub-levels, 15% chance of going down in one sub-level) with sub-level related probabilities only, a probability vector according to the first probabilistic process would be used include a probability for a main level switch, such as for example (25% chance of going to the next main, 65% chance of increasing one of the sublevels, 5% chance staying at the same sub-levels, 5% chance of going down in one sub-level). These thresholds (i.e., level-switch regions) are defined with respect to the maximum values for each sub-level, and may differ in each sub-level. They can be expressed as relative distances in terms of % of the respective maximum values. For example, if a level dimension has a maximum value of '20', a threshold set at 20% would be attained when the corresponding sub-level value reaches '4' or 20% of the maximum value '20'.

At each update period (e.g., in every 4 trials in the fishing game example) the level adjustment function computes the new difficulty level to implement. Thereby, it checks how the value of the dimension-specific sub-levels relate to the main-up-threshold rule (i.e., a check is performed whether the current position is within a rule defined level-switch region). In case the sub-levels of all level dimensions are within such a main-up-threshold region, the system can move up to the next main level (e.g., enhancing the number of fishes to track in the fishing game example). To clarify the notion of main-up-threshold region in the case of the fishing game example, the main-up-threshold regions are defined as regions in the 3-dimensional sub-level space where one of the dimension-specific sub-levels is higher than 10%, another one higher than 20% and the last one higher than 30%. In this example, the order of the sub-levels plays no role. It can be in any order such as S1>10%, S2>20%, S3>30% or S1>20%, S2>30%, S3>10%.

The fixed level-switch regions LS1 and LS2 in FIGS. 3A and 3B therefore illustrate in simplified manner the result of a main-up-threshold rule. The example of LS1 in difficulty level 132-*a* (cf., FIG. 3A) illustrates a main-up-threshold rule LD1>66%, LD2>60% LD3>50%. A different order of these thresholds, like LD1>50%, LD2>60% LD3>66% leads to a different shape of the level-switch region LS1 when rounding the thresholds to integers (LD1>'2', LD2>'6', LD3>'3').

For going down one main level, it may be advantageous to use as a main-down-threshold rule that each of the sub-levels S1 to S3 has to reach its minimal value. However, more complex main-down-threshold rules may be used where flexible threshold combinations are used similar to the main-up-threshold rules described above.

Figure 3C:
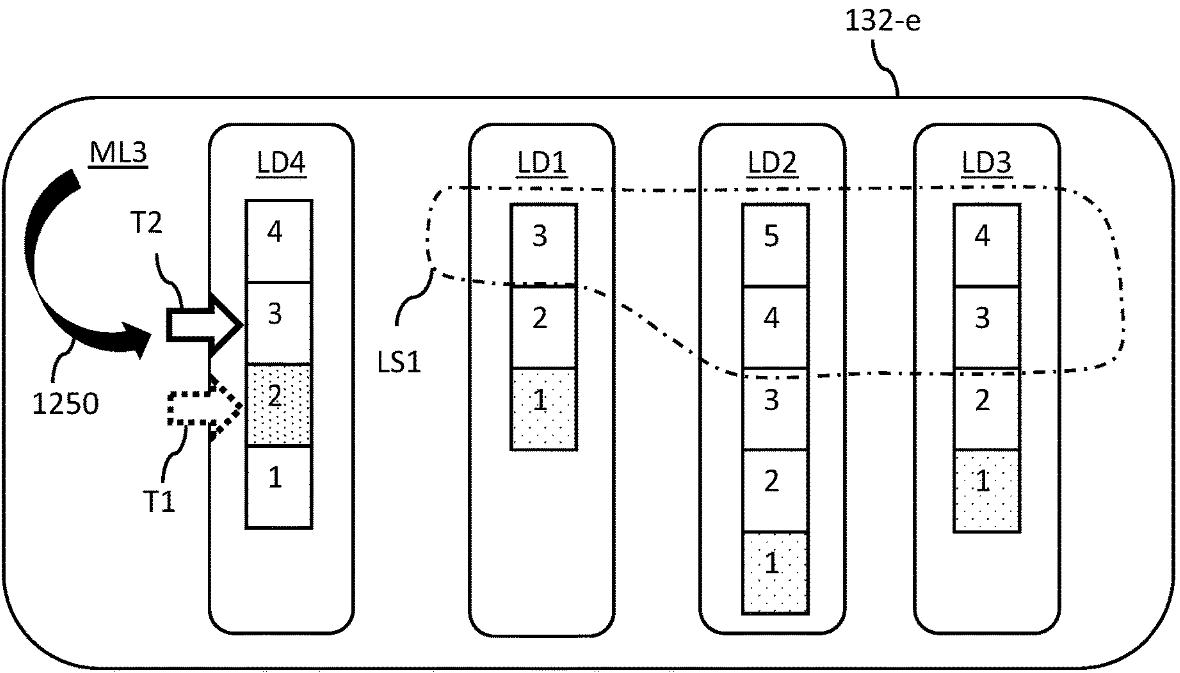
FIG. 3C illustrates an example of level threshold adjustment for a fixed parameter level dimension.
Figure 4A:
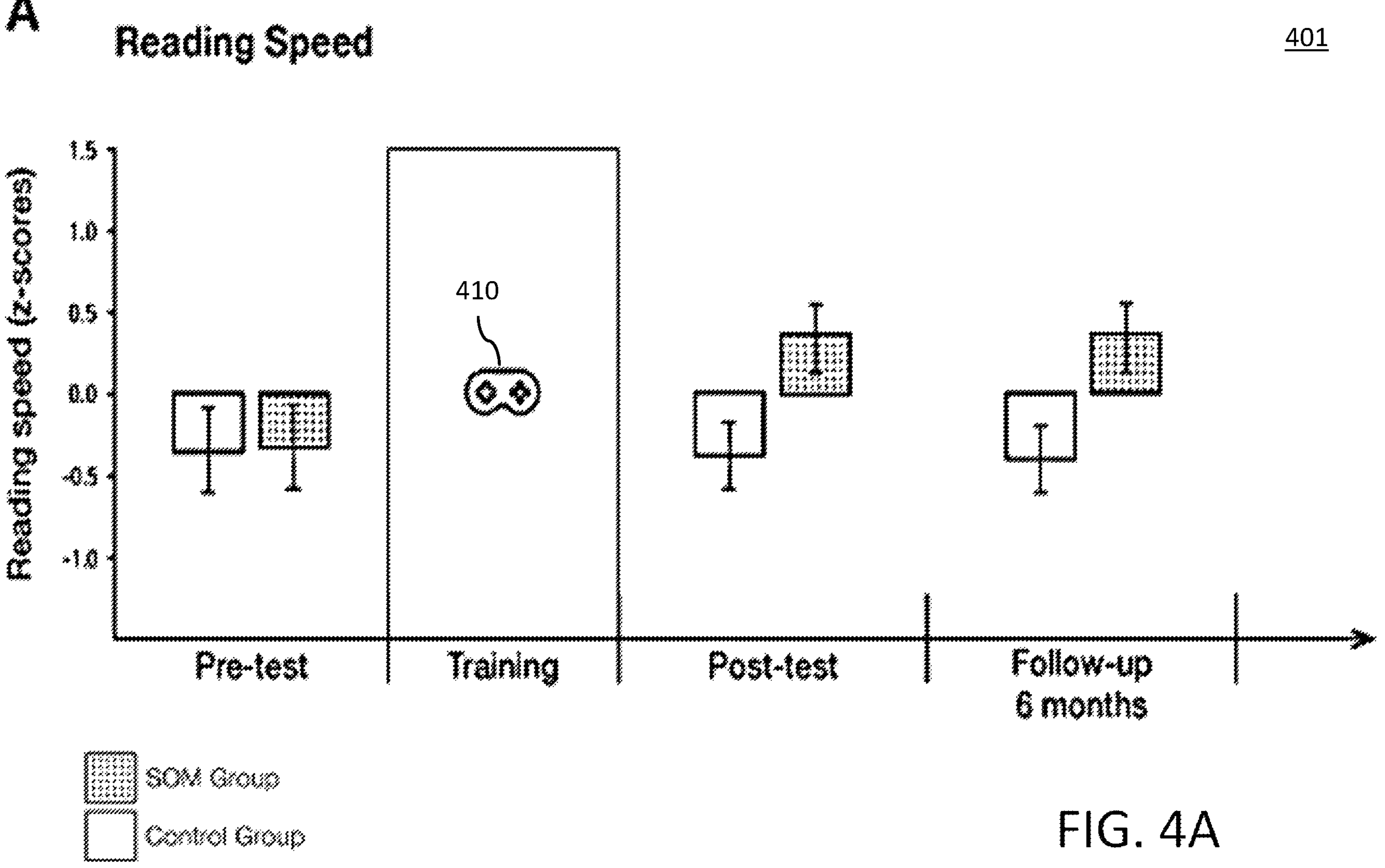
FIGS. 4A to 4D show study results illustrating improvements in the learning-to-learn capability achieved by users after exercising with a video game provided by a self-adaptive computer system as disclosed herein.
Figure 4B:
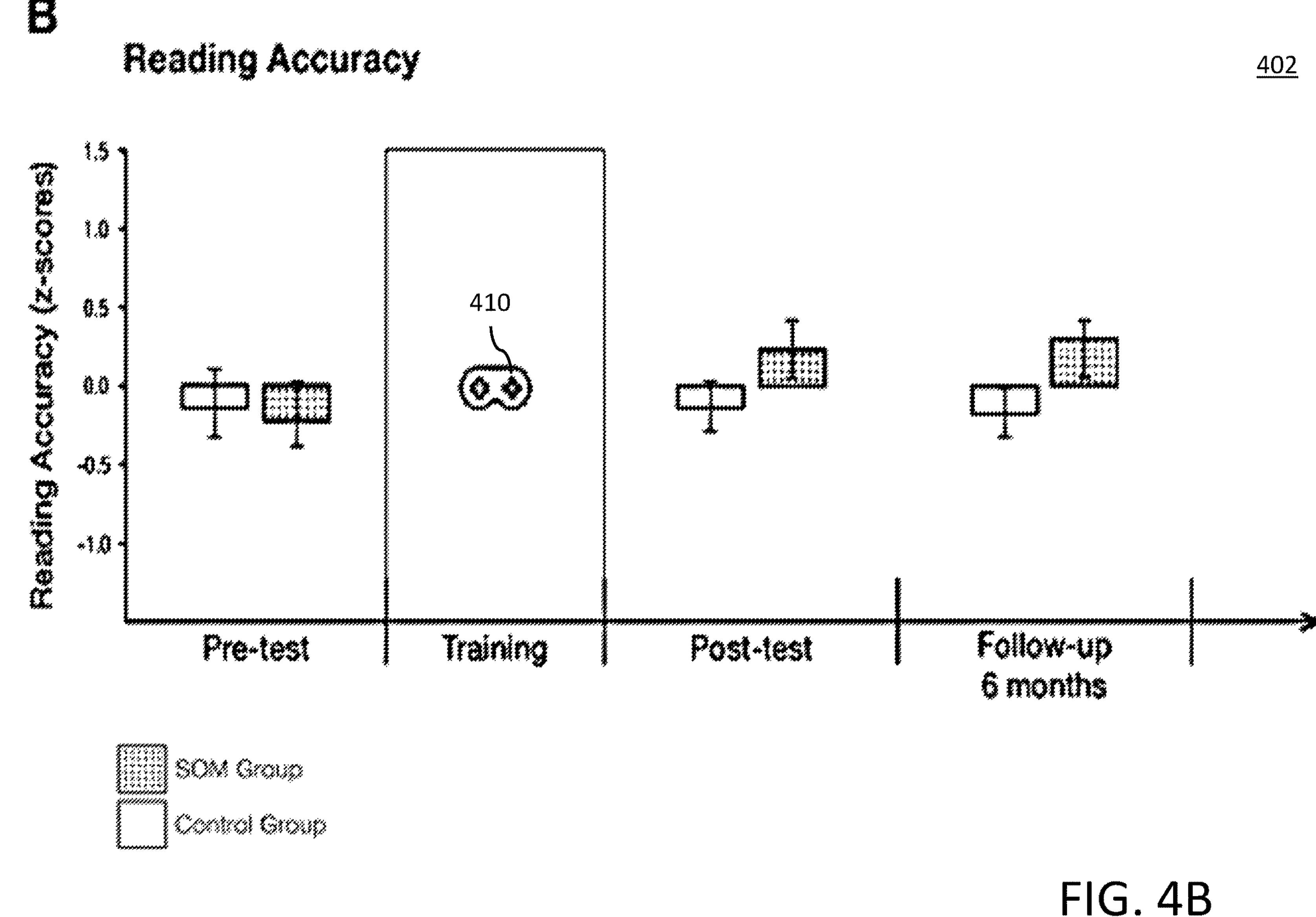
Figure 4C:
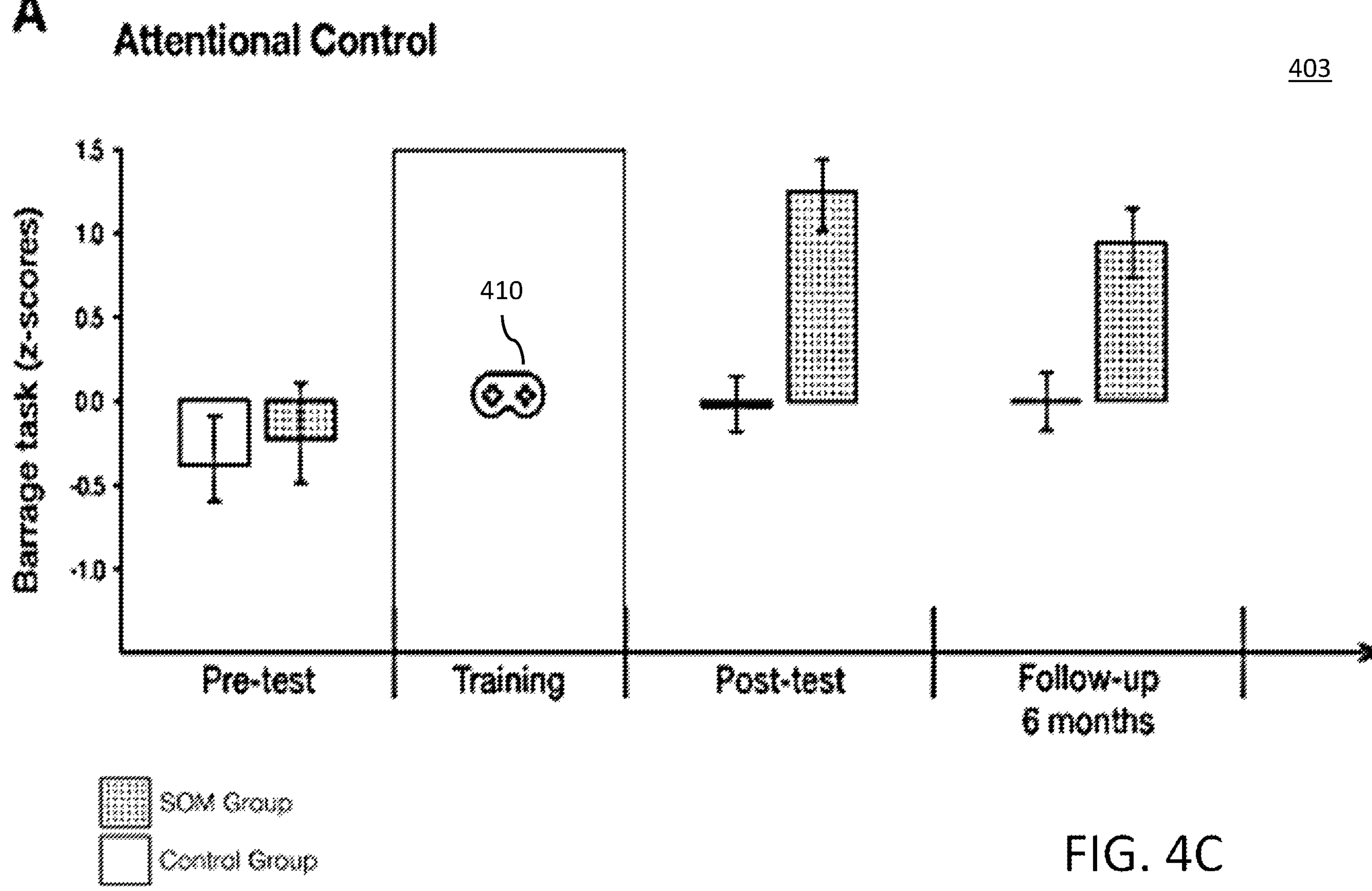
Figure 4D:
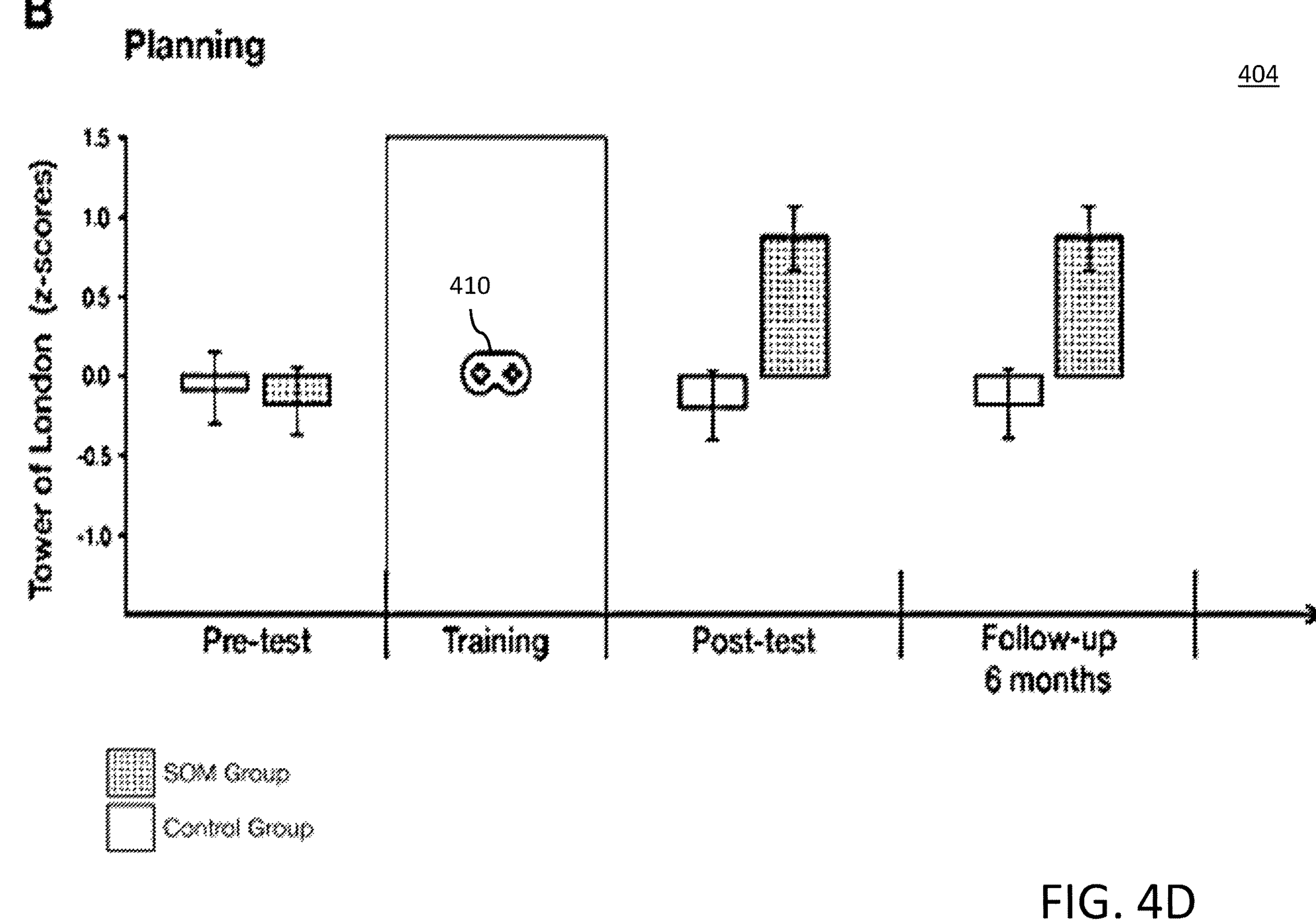

Threshold variability can be a function of main level. For example, fixed parameters may have dynamic values which are dependent on the main level. For example, initially the level adjustment function may use pre-set values, e.g., (10%, 20%, 30%) in any combination with regard to the fixed parameter level dimensions). These pre-set values may then be updated according to the current main level. For example, when the main level has been increased to a higher main level, the main-up-thresholds may be updated accordingly to, for example, (40%, 50%, 60%), then (60%, 70%, 80%), and so on and so forth. An advantage of threshold variability is to provide a more granular control of the level of difficulty and to allow, for example, high-performing users to move faster in low levels. FIG. 3C illustrates the concept of level adjustments for fixed parameters. It is assumed, that the level adjustment function has just switched to the difficulty level 132-*e* by increasing the main level to ML3. The level dimensions LD1 to LD3 are still controlled by the probabilistic processes and have the rule defined level-switch region LS1. However, the level dimension LD4 is an additional level dimension for a fixed parameter (i.e., not under the regime of the probabilistic processes). It is assumed that before the increase of the main level to ML3, the fixed parameter LD4 was associated with a threshold value T1 of '2'. With the increase of the main level, the threshold of LD4 is updated 1250 to T2 with a value of '3'. In this example, the threshold of the fixed parameter is updated proportionally to the main level. However, as shown in the above example, the skilled person can also use dynamic rules which implement a non-linear increase of the thresholds with an increasing main level.

In the fishing game example, the level adjustment function can pseudo-randomly force the exploration of unexplored sub-levels of the previous levels (rollback), for example, every $n^{th}$ update period. This event (exploration event) is aimed at exploring new sub-levels at easier main levels of the game, that might otherwise never be explored. Again, this serves to increase the game play variability. The rollback forced difficulty level may only last for the next update period. Then, the level adjustment function may return to the previous difficulty level.

FIGS. 4A to 4D show study results demonstrating the effect of improving reading capabilities and improving attentional control and planning capabilities of users who whose respective brain functions had been trained with the herein disclosed self-adaptive computer system for automatically adapting difficulty levels of video games to improve the learning-to-learn capabilities of a user (executing the respective self-adaptive computer-implemented method).

With regard to the reading capabilities, it is to be noted that literacy is an essential requisite in modern societies. Poor readers, that is children encountering difficulties with decoding and/or understanding print material, face a disproportionately higher risk of struggling at school and in life. Thus, developing proper training strategies for reading is a goal of upmost importance.

A study was conducted to analyze whether, in a relatively large sample of typically-developing children, training attentional control results in benefits in reading abilities, as measured by not only standardized tests but also school grades. The study is based on an entertaining child-appropriate video game, Skies of Manawak (SOM). This game was designed to target the diversity of cognitive challenges that reading poses and to leverage the reported positive impact of action video game-based training on learning-to-learn. The gameplay, situated in a child-friendly adventure world, revolves around two main game mechanics. One, "The Flight" (the action video game hub module), bears key characteristics of action video games, and in particular a need for pacing, a load on distributed attention and the necessity to shift between divided and focused attention states at proper times. The other, "The Village" (incentive and motivation module), bears key characteristics of an incentive world, where the users through slow-paced, exploratory moves discover how points earned during the rest of the gameplay can be redeemed to personalize his/her world. In the Village, users also discover the next quest they are assigned to, sending them back into the action game or a respective game module. In addition to the Flight, the game includes the above-described game modules (game modules 1) to 10)), each targeting aspects of executive functions engaged during reading acquisition, such as visual and auditory working memory, inhibitory control and cognitive flexibility, etc. Assigned game-modules, their in-game progression, as well as the action game difficulty was adaptively personalized.

151 typically developing Italian children were recruited in this training study. Both the experimental group (N=79) and the active control group (N=72) were pre-tested for visuo-spatial attention, verbal and spatial working memory, planning and literacy skills. All children then underwent 12 hours of training, distributed over 6 weeks, either on the experimental video game provided by the herein discloses system, or on a control video game, Scratch, a kid-tailored, engaging programming game. These two different interventions were presented as active to parents and teachers. Crucially, training was implemented during class hours under the supervision of dedicated staff, trained respectively either in the experimental or the control game, ensuring balanced implementation across the two arms of intervention. The same cognitive measures were collected at post-test, within a week from the end of training, as well as six months later. Among the three experimenters collecting data, two were blinded to the aims of the study, allowing to control for possible experimenter effects.

FIGS. 4A to 4D illustrate the results 401 to 404 of the study. The impact of the experimental videogame provided by the herein described computer system is compared to that of the control training game from pre-test to post-test, and possible long-lasting effects at 6 months on both reading skills (word, non-word and text reading speed (cf. result 401 in FIG. 4A) and accuracy (cf. result 402 FIG. 4B), as well as types of reading errors made in the text reading task), and on a measure of attentional control (cf. result 403 in FIG. 4C). Also planning was considered, an exploratory outcome and measure (cf. result 404 in FIG. 4D) collected at all three time points.

The mean of word, non-word and text reading speed (cf. test result A in FIG. 4A) and accuracy (cf. test result B in FIG. 4B), as measured before training (Pre-test), after training (Post-test), and at 6 months follow-up (Follow-up 6 months) in the SOM-trained (N=79) and the Scratch-trained (N=72, control group) groups. Reading performance is expressed in z-scores. Error bars represent confidence intervals at 95% (CI). The training phase is indicated by the game controller icon 410.

A significantly greater improvement in reading speed was found the SOM group than in the control group. Also, with regard to the reading accuracy, the participants in the SOM group showed a significantly greater improvement than those in the control group. No other effects were significant. Reading errors made in the text reading fluency task were categorized as either Sounding-out behaviors (i.e., sounding out parts of the word before producing the whole word) or Word-substitution errors. The categorization of reading errors applied here aims at differentiating between decoding capabilities and word unitization (i.e., the process by which single linguistic units are consolidated into whole-word units) through the use of separate scores. Sounding-out behaviors are diagnostic of fluency weaknesses in the sub-lexical, orthographic-to-phoneme mapping processes, whereas word-substitution errors (in the presence of normal fluency) rather point to weaknesses in lexical, orthographic and phonological to semantic access processes.

As above, in the SOM group a greater reduction of reading errors was found compared to the control group. This reduction was largely maintained even in the Follow-up 6 months period. Also, a greater reduction in sounding-out behaviors compared to the Word Substitution errors was found in the SOM group in comparison to the control group.

Performance (accuracy score) in the barrage task (A in test result 403, cf. FIG. 4C) and the Tower of London task (B in in test result 404, cf. FIG. 4D) are also expressed in z-scores. Again, they are measured before training (Pre-test), after training (Post-test), and at 6 months follow-up (Follow-up 6 months) in the SOM-trained (N=79) and the Control-trained (N=72) groups. Error bars represent confidence intervals at 95% (CI).

Attention was measured after training by means of a classic barrage task, where children are asked to find as many target objects (bells) amidst distractors as possible. The mean accuracy score between the 'fast' score (number of targets found within 30 seconds) and the 'slow' score (total number of targets identified in 120 seconds) was estimated and used as a composite dependent variable. Greater improvements in attention in SOM than in the Control group were found after the training period. No other significant effects were observed.

In addition, exploratory analyses were carried out on planning, which had been assessed during all measuring periods (before and after training) through the Tower of London task. Again, a greater improvement was found in the SOM than the control group from the pre-test to the post-test period, with this effect being sustained also later on. Thus, as expected given the specific focus of SOM in training attention and higher executive function skills, twelve hours of SOM gameplay led to greater improvement in these skills, as compared to the same amount of gameplay with the control game, Scratch.

Similar encouraging initial results have been obtained in an ongoing study with regard to the treatment of depression users/patients with the herein discloses self-adaptive system and method.

Figure 5:
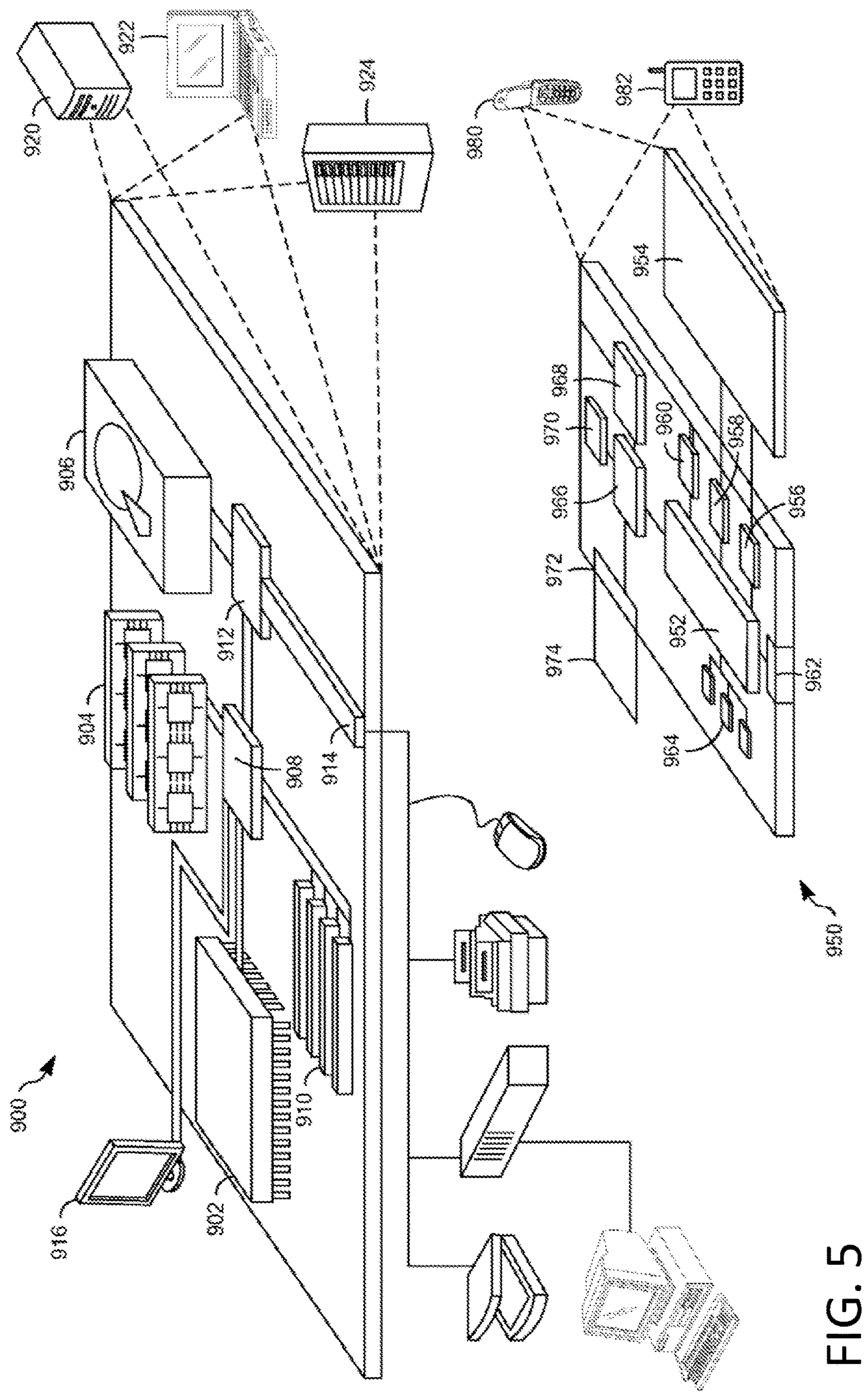
FIG. 5 is a diagram that shows an example of a generic computer device and a generic mobile computer device, which may be used with the techniques described here.

FIG. 5 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the computer system 100 of FIG. 1 providing the video game to the user. Computing device 950 is intended to represent various forms of mobile devices, such as personal digital assistants, cellular telephones, smart phones, and other similar computing devices. For example, computing device 950 may be used as a frontend (e.g., game console and display function) by a user to interact with the computing device 900. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A self-adaptive computer system for automatically adapting difficulty levels of video games to improve a learning-to-learn capability of a user, comprising:

a plurality of video game modules with each game module of the plurality adapted to train the learning-to-learn capability of the user, and configured to capture a gaming performance of the user when exercising with a respective game module, wherein each game module is adaptively selectable for interaction with the user;

a training path module adapted to select a particular game module based on one or more brain training goals for said user, and to adjust a duration of the selected game module for a future game session based on the user's gaming performance;

an action video game hub module configured to provide an action video game with action-mechanics, adapted to engage the user into human-computer interaction in alternation with adaptively selected game modules, and further configured to capture the user's gaming performance when exercising with the action video game;

wherein the hub module and each game module are adapted to generate a setting for the respective difficulty level for said user, wherein each setting comprises a plurality of level dimensions for a respective main level, with each level dimension being associated with a different aspect of the user's gaming performance and having a plurality of dimension-specific sub-levels defining a current position in a multi-dimensional sub-level space, by:

using a first probabilistic process to switch the main level or to switch one of the sub-levels in accordance with the user's gaming performance if the current position is within a rule-defined level-switch region of the multi-dimensional sub-level space, wherein a predefined probability vector is selected based on the user's gaming performance with switching probabilities greater than '0' for increasing or decreasing the main level in accordance with the rule-defined level-switch region, and for increasing one of the sub-levels, for decreasing one of the sub-levels, and for maintaining all sub-levels; and using a second probabilistic process to switch one of the sub-levels in accordance with the user's gaming performance if the current position is outside the rule-defined level-switch region of the multi-dimensional sub-level space, wherein a further predefined probability vector is selected based on the user's gaming performance with switching probabilities greater than '0' for increasing one of the sub-levels, for decreasing one of the sub-levels, and for maintaining all sub-levels, wherein the switching probability, for increasing or decreasing the main level equals '0'.

2. The system of claim 1, wherein the first and second probabilistic processes further using a third probabilistic process for a probabilistic determination of the sub-level to be switched, wherein a probability to determine the current sub-level of a particular level dimension depends on a distance of a current sub-level value to a maximum sub-level value of the particular level dimension in comparison to such distances for other level dimensions of the current main level.

3. The system of claim 1, wherein a particular rule for defining a rule-defined level-switch region defines a threshold for each level dimension based on a respective maximum sub-level value for a respective level dimension, and defines a combination of delta values to be added to corresponding thresholds resulting in corresponding boundary values for each level dimension, with a region between boundary values and respective maximum sub-level values forming a rule-defined level-switch region for difficulty level increase.

4. The system of claim 1, wherein a particular rule for defining a rule-defined level-switch region defines a threshold for each level dimension based on a respective minimum sub-level value for a respective level dimension, and defines a combination of delta values to be subtracted from corresponding thresholds resulting in corresponding boundary values for each level dimension, with the region between the boundary values and the respective minimum sub-level values forming a rule-defined level-switch region for difficulty level decrease.

5. The system of claim 1, wherein a main level has one or more additional level dimensions which are not under control of the first and second probabilistic processes, with an additional level dimension having a threshold for sub-level increase which is updated dependent on the main level.

6. The system of claim 1, wherein the hub module and each game module are further adapted to adjust a current difficulty level to a not-yet-explored combination of sub-levels of a next lower main level if an exploration event is generated by the respective video game.

7. The system of claim 1, wherein for capturing the user's gaming performance, the user's gaming performance includes a dimension-specific performance value for each level dimension, and wherein the dimension-specific performance values are computed as weighted average performance values over a plurality of gaming periods with a weight decreasing from a current period to an earliest period in the plurality of gaming periods.

8. The system of claim 1, wherein each game module and the hub module are configured to capture a current gaming performance of the user in real-time based on predefined performance metrics for assessing winning streaks and losing streaks generated by a respective game or the hub module reflecting the user's current gaming performance while executing the respective game or hub module, wherein winning streaks are runtime events generated in response to the user providing a succession of correct game answers without error, and losing streaks are runtime events generated when the user's gaming performance drops under a pre-set level for a given duration.

9. The system of claim 1, wherein the training path module is adapted to:

allocate a larger duration for a particular game module of a subset of game modules for a next quest of the user if a current gaming performance of the user falls below a given target performance;

allocate a shorter duration for a particular game module of the subset of game modules for the next quest of the user if the user's current gaming performance exceeds a given target performance; and/or remove a game module from the subset of game modules for the next quest if the allocated duration of the game module has reached a given minimum duration value.

10. The system of claim 1, further comprising:

an incentive-motivation module configured to provide information for the user how earned points can be redeemed, and to discover a next quest to which the user gets assigned, and to send the user back to an action video game hub or to a corresponding game module with the next quest.

11. The system of claim 1, wherein the action video game of the action video game hub module requires visuo-motor coordination to train a brain function of the user: divided attention combined with flexible switches to a focus attention state as a task requires high precision; and wherein the game modules are adapted to train brain functions including: Sustained attention, Divided attention, Updating, Problem Solving and Planning, Selective attention, Cognitive flexibility, and Attentional tracking.

12. A computer-implemented method for automatically adapting difficulty levels of a video game for a user in relation to a gaming performance of the user, the method comprising:

capturing a gaming performance of the user when exercising with the video game;

generating a setting for a difficulty level for said user wherein each setting comprises a plurality of level dimensions for a respective main level), with each level dimension being associated with a different aspect of the user's gaming performance and having a plurality of dimension-specific sub-levels defining a current position in a multi-dimensional sub-level space, wherein generating further comprises:

if the current position is within a rule-defined level-switch region of the multi-dimensional sub-level space, using a first probabilistic process to switch a main level or to switch one of the dimension-specific sub-levels in accordance with the user's gaming performance, wherein a predefined probability vector is selected based on the user's gaming performance with switching probabilities greater than '0' for increasing or decreasing the main level in accordance with the rule-defined level-switch region, and for increasing one of the sub-levels, for decreasing one of the sub-levels, and for maintaining all sub-levels;

if the current position is outside the rule-defined level-switch region of the multi-dimensional sub-level space, using a second probabilistic process to switch one of the sub-levels in accordance with the user's gaming performance, wherein a further predefined probability vector is selected based on the user's gaming performance with switching probabilities greater than '0' for increasing one of the sub-levels, for decreasing one of the sub-levels, and for maintaining all sub-levels, wherein the switching probability for increasing or decreasing the main level equals '0'.

13. The method of claim 12, wherein the first and second probabilistic processes further comprise a third probabilistic process for a probabilistic determination of the one of the sub-levels to be switched, wherein a probability to determine a current sub-level of a particular level dimension depends on a distance of a current sub-level value to a maximum sub-level value of the particular level dimension in comparison to corresponding distances for other level dimensions of the main level.

14. The method of claim 12, wherein a particular rule for defining a rule-defined level-switch region defines a threshold for each level dimension based on a respective maximum sub-level value for a respective level dimension, and defines a combination of delta values to be added to corresponding thresholds resulting in corresponding boundary values for each level dimension, with a region between the boundary values and the respective maximum sub-level values forming a rule-defined level-switch region for difficulty level increase, and wherein a particular rule for defining a rule-defined level-switch region defines a threshold for each level dimension based on a respective minimum sub-level value for the respective level dimension, and defines a combination of delta values to be subtracted from the corresponding thresholds resulting in corresponding boundary values for each level dimension, with the region between the corresponding boundary values and the respective minimum sub-level values forming a rule-defined level-switch region for difficulty level decrease.

15. The method of claim 12, wherein a main level has one or more additional level dimensions which are not under a control of the first and second probabilistic processes, with an additional level dimension having a threshold for sub-level increase which is updated dependent on the main level.

16. A computer program product for automatically adapting difficulty levels of a video game to improve a learning capability of a user, the computer program product being tangibly embodied on a non-transitory computer-readable storage medium and comprising instructions that, when executed by at least one computing device, are configured to cause the at least one computing device to:

capture a gaming performance of the user when exercising with the video game;

generate a setting for the difficulty level for said user wherein each setting comprises a plurality of level dimensions for a respective main level), with each level dimension being associated with a different aspect of the user's gaming performance and having a plurality of dimension-specific sub-levels defining a current position in a multi-dimensional sub-level space, wherein the generating the setting further comprises:

if the current position is within a rule-defined level-switch region of the multi-dimensional sub-level space, use a first probabilistic process to switch the respective main level or to switch one of the plurality of dimension-specific sub-levels in accordance with the user's gaming performance, wherein a predefined probability vector is selected based on the user's gaming performance with switching probabilities greater than '0' for increasing or decreasing the respective main level in accordance with the rule-defined level-switch region, and for increasing one of the sub-levels, for decreasing one of the sub-levels, and for maintaining all sub-levels;

if the current position is outside the rule-defined level-switch region of the multi-dimensional sub-level space, use a second probabilistic process to switch one of the sub-levels in accordance with the user's gaming performance, wherein a further predefined probability vector is selected based on the user's gaming performance with switching probabilities greater than '0' for increasing one of the sub-levels, for decreasing one of the sub-levels, and for maintaining all sub-levels, wherein the switching probability for increasing or decreasing the main level equals '0'.

17. The computer program product of claim 16, wherein the first and second probabilistic processes further comprise a third probabilistic process for a probabilistic determination of the sub-level to be switched, wherein a probability to determine a current sub-level of a particular level dimension depends on a distance of a current sub-level value to a maximum sub-level value of the particular level dimension in comparison to corresponding distances for other level dimensions of the current main level.

18. The computer program product of claim 16, wherein a particular rule for defining a rule-defined level-switch region defines a threshold for each level dimension based on a respective maximum sub-level value for the respective level dimension, and defines a combination of delta values to be added to corresponding thresholds resulting in corresponding boundary values for each level dimension, with the region between the boundary values and the respective maximum sub-level values forming a rule-defined level-switch region for difficulty level increase, and wherein a particular rule for defining a rule-defined level-switch region defines a threshold for each level dimension based on a respective minimum sub-level value for a respective level dimension, and defines a combination of delta values to be subtracted from the corresponding thresholds resulting in corresponding boundary values for each level dimension, with a region between the corresponding boundary values and respective minimum sub-level values forming a rule-defined level-switch region for difficulty level decrease.

19. The computer program product of claim 16, wherein a main level has one or more additional level dimensions which are not under a control of the first and second probabilistic processes, with an additional level dimension having a threshold for sub-level increase which is updated dependent on the main level.

* * * * *